US009533186B2

(12) United States Patent
Kristiansen et al.

(10) Patent No.: US 9,533,186 B2
(45) Date of Patent: Jan. 3, 2017

(54) ADJUSTABLE STATIONARY FITTING VEHICLE WITH SIMULATED ELEVATION CONTROL

(71) Applicant: Cycling Sports Group, Inc., Wilton, CT (US)

(72) Inventors: Morten Kristiansen, Norwalk, CT (US); Daniel L. Connors, Southbury, CT (US); Christopher Kautz, Danbury, CT (US); Scott Alan Rice, San Diego, CA (US)

(73) Assignee: Cycling Sports Group, Inc., Wilton, CT (US)

( * ) Notice: Subject to any disclaimer, the term of this patent is extended or adjusted under 35 U.S.C. 154(b) by 0 days.

(21) Appl. No.: 14/309,690

(22) Filed: Jun. 19, 2014

(65) Prior Publication Data
US 2014/0378280 A1 Dec. 25, 2014

Related U.S. Application Data

(60) Provisional application No. 61/837,391, filed on Jun. 20, 2013, provisional application No. 61/837,396, (Continued)

(51) Int. Cl.
*A63B 69/16* (2006.01)
*A63B 22/06* (2006.01)
(Continued)

(52) U.S. Cl.
CPC ....... *A63B 22/0605* (2013.01); *A63B 22/0046* (2013.01); *B60R 16/037* (2013.01);
(Continued)

(58) Field of Classification Search
CPC ............ A63B 22/0605; A63B 22/0046; A63B 2220/806; A63B 2225/20; A63B 2225/096; A63B 2225/15; A63B 2230/06; A63B 2022/0635; A63B 22/06; A63B 2022/0611; A63B 2022/0617; A63B 2022/0623; A63B 2022/0629; A63B 2022/0641; A63B 2022/0647; A63B 2022/0652; A63B 2022/0658; A63B 69/16; A63B 2069/161; A63B 2069/162; A63B 2069/163; A63B 2069/164; A63B 2069/165; A63B 2069/166; A63B 2069/167; A63B 2069/168; A63B 23/0476; A63B 2230/62; A63B 2230/625; A63B 2230/00; A63B 2225/09; A63B 2225/093; A63F 13/00; B62K 3/00
(Continued)

(56) References Cited

U.S. PATENT DOCUMENTS 3,062,204 A 11/1962 Stefano
3,750,479 A 8/1973 Gause et al.
(Continued)

FOREIGN PATENT DOCUMENTS

CA 2599244 2/2008
EP 2353983 8/2011
(Continued)

OTHER PUBLICATIONS

International Search Report for PCT/US 14/43270; mailed Jan. 2, 2015.
(Continued)

*Primary Examiner* — Oren Ginsberg
*Assistant Examiner* — Megan Anderson
(74) *Attorney, Agent, or Firm* — Brian G. Gilpin; Godfrey & Kahn, S.C.

(57) ABSTRACT

An optimal bicycle frame size and configuration is determined based on operational characteristics provided by a rider when riding an adjustable stationary bicycle. An opti-
(Continued)

mal motorcycle and motorcycle configuration is determined based on characteristics of the rider when riding an adjustable stationary motorcycle. A camera system can be used to collect anthropomorphic data about the rider to establish an initial positioning of the components of the adjustable vehicle. The camera system can also be used to collect real-time information about the rider's body positioning so as to cause adjustment of the positioning of the components of the adjustable vehicle.

4 Claims, 27 Drawing Sheets

Related U.S. Application Data filed on Jun. 20, 2013, provisional application No. 61/926,877, filed on Jan. 13, 2014.

(51) Int. Cl.
   *B60R 16/037* (2006.01)
   *G05B 13/02* (2006.01)
   *A63B 22/00* (2006.01)
   *B62K 3/00* (2006.01)

(52) U.S. Cl.
   CPC ............... *B62K 3/00* (2013.01); *G05B 13/02* (2013.01); *A63B 2022/0635* (2013.01); *A63B 2220/806* (2013.01); *A63B 2225/096* (2013.01); *A63B 2225/15* (2013.01); *A63B 2225/20* (2013.01); *A63B 2230/06* (2013.01)

(58) Field of Classification Search
   USPC ........................................ 280/278, 287, 220
   See application file for complete search history.

(56) References Cited

U.S. PATENT DOCUMENTS

| | | | |
|---|---|---|---|
| 3,861,807 A | 1/1975 | Lescrenier | |
| 4,637,604 A | 1/1987 | DuPont | |
| 4,768,777 A | 9/1988 | Yang | |
| 5,006,072 A | 4/1991 | Letovsky | |
| 5,035,418 A * | 7/1991 | Harabayashi | A63B 22/0023 482/57 |
| 5,158,515 A | 10/1992 | Cortes | |
| 5,240,417 A | 8/1993 | Smithson et al. | |
| 5,312,311 A | 5/1994 | Pearson | |
| 5,527,248 A | 6/1996 | Crivello | |
| 5,549,527 A | 8/1996 | Yu | |
| 5,654,996 A | 8/1997 | Steinberg et al. | |
| 5,782,639 A * | 7/1998 | Beal | A63B 71/0622 434/29 |
| 5,890,995 A | 4/1999 | Bobick et al. | |
| 5,913,752 A | 6/1999 | Bolf | |
| 6,066,073 A | 5/2000 | Stearns et al. | |
| 6,126,577 A | 10/2000 | Chang | |
| 6,159,130 A | 12/2000 | Torvinen | |
| 6,251,047 B1 | 6/2001 | Stearns et al. | |
| 6,648,802 B2 * | 11/2003 | Ware | A63B 21/015 482/57 |
| 6,669,603 B1 | 12/2003 | Forcillo | |
| 7,081,070 B1 | 7/2006 | Washington et al. | |
| 7,399,259 B2 | 7/2008 | Somwong | |
| 7,438,672 B1 | 10/2008 | Rylander et al. | |
| 7,481,746 B2 | 1/2009 | Ibarguren | |
| 7,641,600 B2 | 1/2010 | Bingham et al. | |
| 7,682,286 B2 | 3/2010 | Badameh et al. | |
| 7,762,930 B2 | 7/2010 | Egger | |
| 7,771,325 B2 | 8/2010 | Baker | |
| 7,905,817 B2 | 3/2011 | Giannascoli et al. | |
| 8,077,830 B2 * | 12/2011 | Brown | A61N 5/1048 378/156 |
| 8,950,256 B2 * | 2/2015 | Kautz | A63B 69/16 73/379.01 |
| 2002/0004439 A1 | 1/2002 | Galbraith et al. | |
| 2002/0151414 A1 | 10/2002 | Baker | |
| 2003/0171190 A1 | 9/2003 | Rice | |
| 2004/0053750 A1 | 3/2004 | Forcillo | |
| 2004/0176218 A1 | 9/2004 | Fan | |
| 2004/0198561 A1 | 10/2004 | Corbalis et al. | |
| 2004/0237666 A1 | 12/2004 | Winkenbach et al. | |
| 2004/0248702 A1 | 12/2004 | Baker | |
| 2005/0221960 A1 | 10/2005 | Miyamaru et al. | |
| 2005/0221961 A1 | 10/2005 | Forcillo | |
| 2005/0239609 A1 | 10/2005 | Chen | |
| 2006/0003870 A1 | 1/2006 | Corbalis et al. | |
| 2006/0003872 A1 | 1/2006 | Chiles et al. | |
| 2006/0094568 A1 | 5/2006 | Underbrink et al. | |
| 2006/0094569 A1 | 5/2006 | Day | |
| 2006/0105887 A1 | 5/2006 | Hao | |
| 2006/0172867 A1 | 8/2006 | Lee | |
| 2006/0199700 A1 | 9/2006 | LaStayo et al. | |
| 2006/0234836 A1 | 10/2006 | Kuo | |
| 2006/0234837 A1 | 10/2006 | Kuo | |
| 2006/0270522 A1 | 11/2006 | Yonehana et al. | |
| 2007/0003910 A1 | 1/2007 | Kirila | |
| 2007/0004488 A1 | 1/2007 | Kirila | |
| 2007/0099766 A1 | 5/2007 | Pyles et al. | |
| 2007/0099767 A1 | 5/2007 | Harashima | |
| 2007/0105694 A1 | 5/2007 | Panatta | |
| 2007/0142177 A1 | 6/2007 | Simms et al. | |
| 2007/0149364 A1 | 6/2007 | Blau et al. | |
| 2007/0161467 A1 | 7/2007 | Lee | |
| 2007/0173381 A1 | 7/2007 | Chen et al. | |
| 2007/0281835 A1 | 12/2007 | Baker | |
| 2008/0020908 A1 | 1/2008 | Ibarguren | |
| 2008/0058170 A1 | 3/2008 | Giannascoli et al. | |
| 2010/0076721 A1 | 3/2010 | Simms et al. | |
| 2010/0306160 A1 | 12/2010 | Simms | |
| 2012/0202653 A1 | 8/2012 | Seastrom | |
| 2014/0221158 A1 * | 8/2014 | Mabey | A63B 21/0088 482/4 |
| 2015/0119203 A1 * | 4/2015 | Kautz | A63B 69/16 482/57 |
| 2015/0182785 A1 * | 7/2015 | Seastrom | A63B 71/0622 482/57 |

FOREIGN PATENT DOCUMENTS

| | | |
|---|---|---|
| EP | 1410984 | 4/2014 |
| FR | 2495307 | 6/1982 |
| JP | S5932801 A | 6/1982 |
| JP | 59032801 | 2/1984 |
| WO | WO2010034078 | 4/2010 |

OTHER PUBLICATIONS

International Search Report for PCT/US 14/43275; mailed Dec. 31, 2014.

International Search Report for PCT/US2013/059162; mailed Dec. 18, 2013.

* cited by examiner

ADJUSTABLE STATIONARY FITTING VEHICLE WITH SIMULATED ELEVATION CONTROL

CROSS-REFERENCE TO RELATED APPLICATION

This application is based on and claims priority to U.S. Provisional Patent Application Nos. 61/837,391 and 61/837,396 filed on Jun. 20, 2013, and 61/926,877 filed on Jan. 13, 2014, the disclosures of which are incorporated herein by reference in their entirety for all purposes.

FIELD OF THE INVENTION

The present application relates to vehicle fitting systems, particularly to an adjustable stationary bicycle or an adjustable stationary motorcycle used as a fitting apparatus to determine the optimal fit vehicle for a given rider and desired performance characteristics.

BACKGROUND

In riding a bicycle, the pedaling power of the user is a primary factor in determining how fast the rider will get to the destination. There are other factors associated with the bicycle and the interaction between the rider and the bicycle, such as the wind resistance (i.e., drag coefficient) and the weight of the rider and/or bicycle. In order to optimize the power output of the rider on the bicycle, it is important that the bicycle be of appropriate dimensions for the rider. The rider must be in an aerodynamic riding position as much as possible, but the position should also affect the breathing and the pedaling of the rider as little as possible. The pedaling power is directly related to the heart rate of the rider and adequate breathing is essential to an optimized riding position.

At present, when purchasing a bicycle, a rider moves onto the bike having its rear wheel supported by a trainer. According to the salesman's experience, various adjustments are made (vertical and horizontal position of the seat, stem length and handlebar height) until a suitable riding position is reached, often as visually decided by the salesman. The rider must at the very least stop pedaling and lean forward to make adjustments to the seat. In some instances, the rider must come off the bicycle for adjustments to be made and obviously must completely dismount to test a different frame size. Similarly, cyclists who desire the optimal performance of their bicycle may wish to measure the effect of various configurations and equipment positions to ensure the best arrangement for a desired performance, e.g., sprint, triathlon, endurance, etc. Such an optimization generally requires the repeated and manual adjustment of the seat, handlebars, etc.

Several motorized or mechanically actuated devices have been designed in an effort to streamline the bicycle fitting process. For example, U.S. Pat. No. 7,905,817 to Giannascoli et al., the disclosure of which is incorporated herein by reference for all purposes, discloses a stationary bicycle with motor-adjustable translational joints between the frame and the handlebars and the frame and the seat. This design enables the adjustment of the relative positions of the seat and handlebars with respect to the crank while the rider is positioned on the stationary bicycle. As further disclosed in U.S. Appl. Pub. No. 2013-0065733 to Kautz et al., the disclosure of which is incorporated herein by reference for all purposes, the best fitting bicycle frame may be determined using a stationary bicycle such as the one disclosed in Giannascoli et al. and measuring power, cadence, and other parameters associated with the performance of the rider under various setup positions. Another design of a motorized or mechanically-driven adjustable stationary bicycles is disclosed in U.S. Appl. Pub. No. 2011-0237397 to Mabey et al., the disclosure of which is incorporated herein by reference. The Mabey et al. design incorporates numerous mechanical actuators to adjust the relative position of the handlebars and seat with respect to the crank based on verbal feedback from the rider and power measurements taken by the device.

In addition, there are prior art camera or biometric measurement based systems known for use in bicycle fitting. For example, U.S. Appl. Pub. Nos. 2007-0142177, 2010-0076721, and 2010-0306160 to Simms all relate to systems for using physical measurements of a cyclist and visual marker tracker systems to assist in the bicycle fitting process.

As with bicycles, a rider's position on a motorcycle can affect how well the rider is able to manipulate the motorcycle and can affect the performance of the rider. Different performance characteristics are desired depending on the type of motorcycle and type of riding involved, e.g., off road vs. on road, endurance vs. sprint, and competitive vs. leisure riding. It is therefore desirable to optimally fit a motorcycle to the rider in terms of body as well as type of riding. Configurations can vary greatly depending on the circumstances. For example, an optimal motorcycle or motorcycle configuration for a rider who is 6'5" tall engaging in cross-country touring is very different from the optimal motorcycle or motorcycle configuration for a rider who is 5'8" tall participating in competitive off road motocross events. Historically, fitting a motorcycle to a rider has been performed by educated guesswork and trial and error. The inclusion into the fitting mix of various designs for aftermarket handlebars and other customization options makes fit optimization all the more difficult.

The prior art mechanical and motor-driven adjustable stationary bicycles all suffer to varying degrees from one or more of the following deficiencies: significant stand-over height making it difficult for smaller riders to use the devices; numerous expensive actuators/motors required to accomplish adjustments increasing the cost and service requirements for the devices; inability to provide a simulated climbing or descending of hills to replicate actual riding conditions; and multiple crank positions are required to accommodate different riders. Existing fitting techniques for optimizing a motorcycle configuration are rudimentary at best. As such, there is a need for an adjustable vehicle fitting system that overcomes some or all of these shortcomings. Similarly, the existing systems for including biometric information in the fitting process suffer from various shortcomings, such as an inability to offer real-time adjustments while the rider is actively riding or simulating riding and the inability to effectively pre-fit a rider.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY

One embodiment of the invention includes a stationary bicycle having a frame, a foot support, such as a crank set rotatably mounted or a foot peg mounted, to the frame, a handlebar adjustably disposed on the frame to be adjustable in X and Y directions relative to the crank set, a seat adjustably disposed on the frame to be adjustable in X and Y directions relative to the crank set, a mechanism operably connected to the handlebar and the seat to facilitate adjustment of the respective handlebar and seat in the X and Y directions, and a bicycle controller. In one alternative embodiment, the stationary bicycle can be mounted to a base such that the frame is pivotable with respect to the base to help simulate uphill or downhill cycling conditions more effectively than a simple adjustment of wheel resistance. The bicycle controller system facilitates: movement of the handlebar and the seat in the X and Y directions; determination of an optimal bicycle frame size for a rider based on operational characteristics provided by the rider when riding the stationary bicycle; determination of a best-fit bicycle frame size that is a closest match to the optimal frame size based on a comparison of available frame sizes stored in a database, the best-fit bicycle frame having a head tube and a seat tube; determination of at least one of the optimal X,Y location of the handlebar relative to the foot support based on the location of the rider's hands, and the optimal X,Y location of the seat relative to the foot support based on the location of the rider's derriere; determination of a stem and spacer from a list of available stems and spacers that will best fit between the head tube of the best-fit frame and the optimal X,Y location of the handlebar; determination of a seat post from a list of available seat posts that will best fit between the seat tube of the best-fit frame and the optimal X,Y location of the seat; and output of a list of the best-fit frame, the best fit stem and spacer, and the best fit seat post. The initial positioning of the stationary bicycle components, as well as their real-time adjustment while the rider is operating the bicycle, can be assisted through the use of a camera system that collects anthropometric data about the rider and provides it to the controller system.

An embodiment of the invention includes a method for using an adjustable stationary bicycle to determine an optimal bicycle frame size and/or an optimal setup of the frame, seat, and handlebars for a rider based on operational characteristics provided by the rider when riding the adjustable stationary bicycle. A best-fit bicycle frame size that is a closest match to the optimal frame size based on a comparison of available frame sizes stored in a database, the best-fit bicycle frame having a head tube and a seat tube, is determined. At least one of the optimal X,Y location of the handlebar relative to the foot support based on the location of the rider's hands, and the optimal X,Y location of the seat relative to the foot support based on the location of the rider's derriere, is determined. A stem and spacer from a list of available stems and spacers that will best fit between the head tube of the best-fit frame and the optimal X,Y location of the handlebar is determined. A seat post from a list of available seat posts that will best fit between the seat tube of the best-fit frame and the optimal X,Y location of the seat is determined. A list of the best-fit frame, the best fit stem and spacer, and the best fit seat post, is produced. The initial positioning of the stationary bicycle components as well as their real-time adjustment while the rider is operating the bicycle can assisted through the use of a camera system that collects anthropometric data about the rider and provides it to the controller system that adjusts the positions of the components of the adjustable stationary bicycle.

One additional embodiment of the invention includes a method for using an adjustable stationary motorcycle to determine an optimal motorcycle and/or an optimal setup of a motorcycle for a rider based on operational characteristics provided by the rider when simulating the riding of the motorcycle. A best-fit motorcycle that is a closest match to the optimal motorcycle based on a comparison of available sizes and types stored in a database is determined. At least one of the optimal X,Y location of the handlebars relative to the foot pegs based on the location of the rider's hands, and the optimal X,Y location of the seat position relative to the foot pegs based on the location of the rider's derriere, is determined. A handlebar from a list of available handlebars that will best fit the rider based on the optimal X,Y location of the handlebar is determined. A seat from a list of available seats that will best fit the rider based on the optimal X,Y location of the seat is determined. A list of the best-fit motorcycle, the best fit handlebars, and the best fit seat, is produced. The initial positioning of the components as well as their real-time adjustment while the rider is simulating operating the motorcycle can assisted through the use of a camera system that collects anthropometric data about the rider and provides it to the controller system that adjusts the positions of the components.

DETAILED DESCRIPTION

The present invention contemplates the use of an adjustable vehicle fitting apparatus to determine the optimal fit for a particular vehicle rider based on various objectives, e.g., comfort, speed, endurance, body position, sprint capability, etc. Disclosed are several embodiments of adjustable stationary bicycles or motorcycle fitting apparatus, a system and method for operation of the bicycles and motorcycle fitting apparatus, and the use of a camera system to collect anthropomorphic data for use in the initial setup of the vehicle fitting apparatus and to make real-time adjustments to the setup while the vehicle fitting apparatus is being operated by the rider.

While certain embodiments are described in detail with respect to an adjustable stationary bicycle, for expediency they are not repeated with respect to an adjustable stationary motorcycle. It should be understood that similar designs and configurations could be used as an adjustable stationary motorcycle, the primary difference being foot pegs on the motorcycle instead of the crank and pedals used in a bicycle. The foot pegs in the adjustable stationary motorcycle embodiment may be repositionable and optimized. In addition, the system and optimization method described in detail with respect to bicycle selection and fitting can be implemented in the same fashion in motorcycle selection and fitting.

Figure 1:
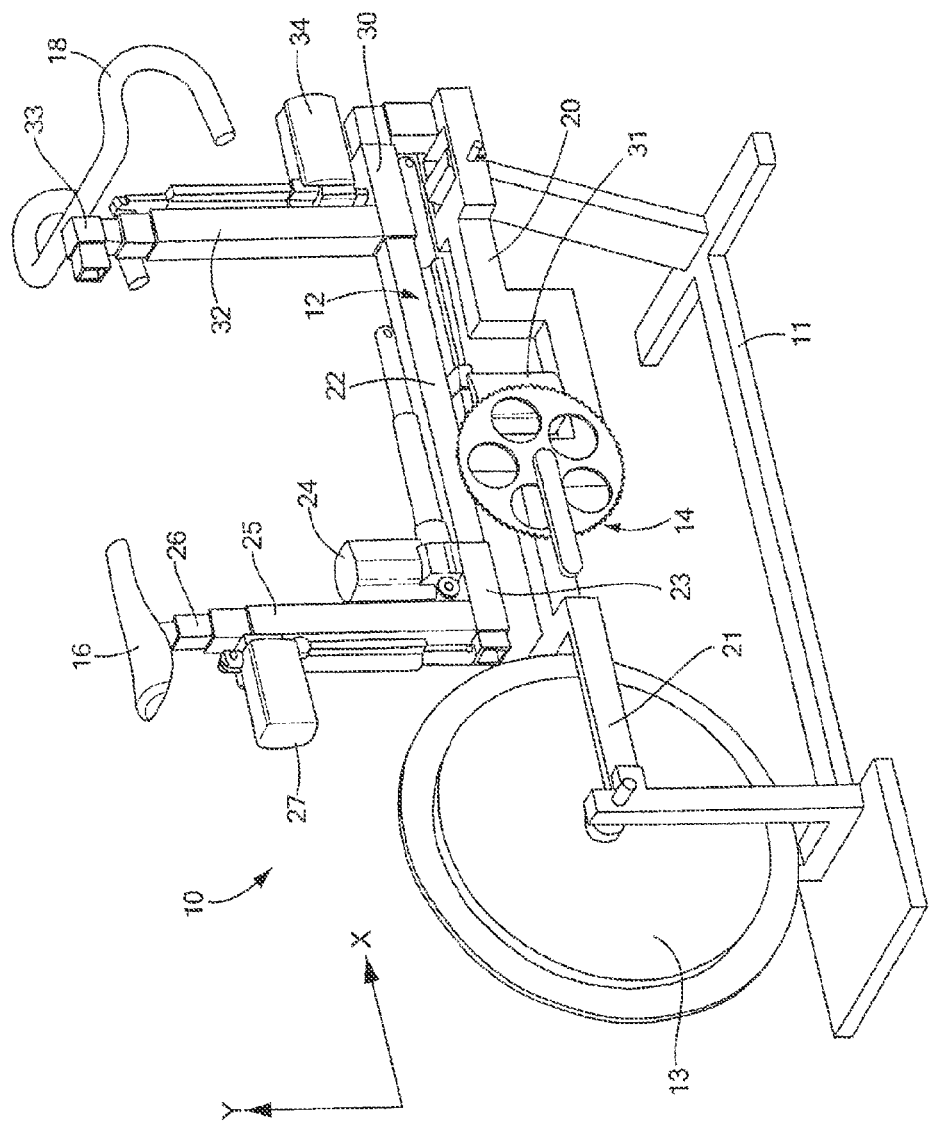
FIG. 1 is a rear perspective view of a prior art adjustable stationary bicycle.
Figure 2:
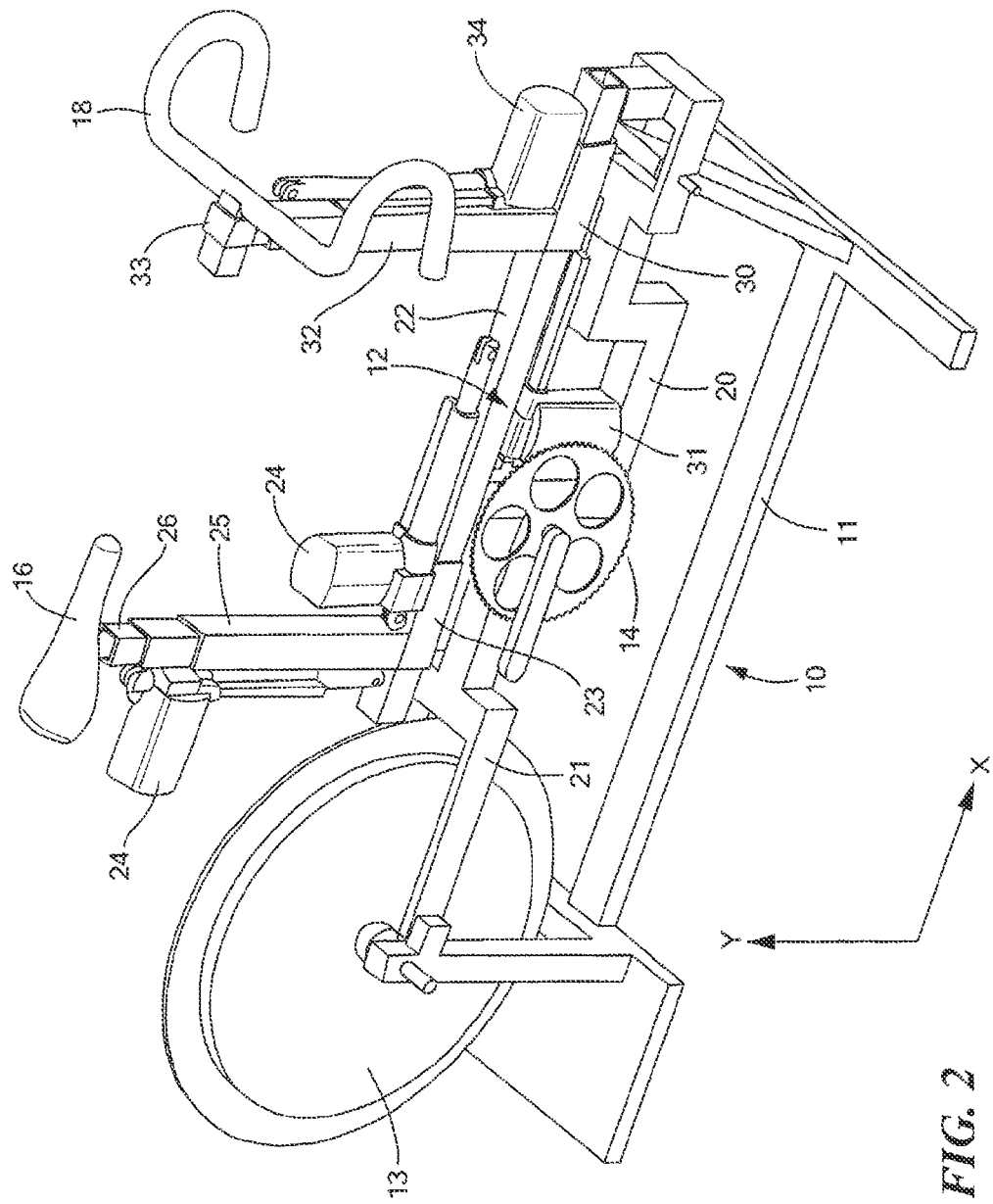
FIG. 2 is a front perspective view of the adjustable stationary bicycle of FIG. 1.
Figure 3:
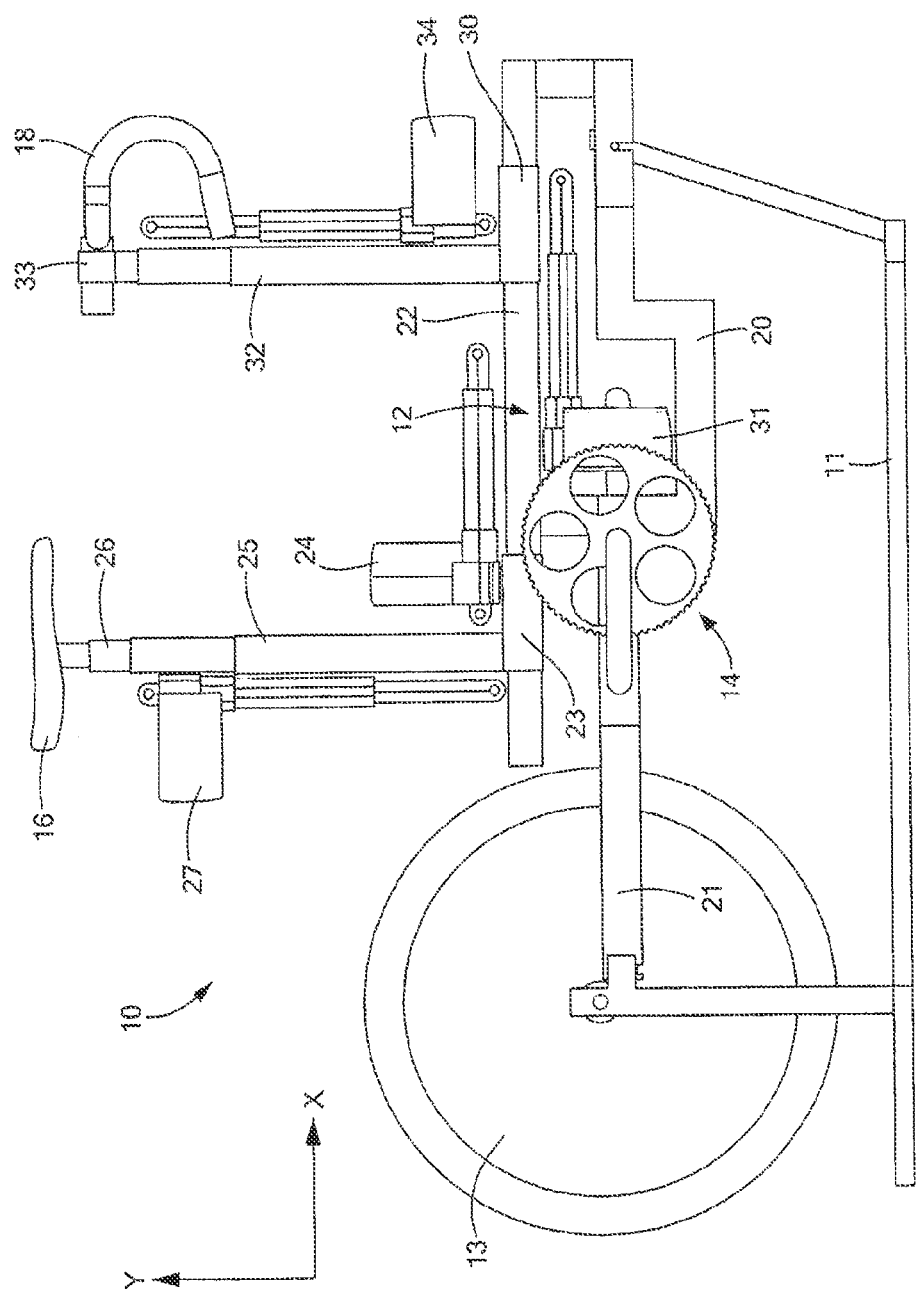
FIG. 3 is a side elevation view of the adjustable stationary bicycle of FIG. 1.

Referring now to the drawings and more particularly to FIGS. 1 to 3, a prior art adjustable stationary bicycle is generally shown at 10. The stationary bicycle 10, has a base 11, a frame 12, an exercise wheel 13, a foot support in the form of a crank set 14, a seat 16 and a handlebar 18. The base 11 supports a remainder of the bicycle 10. The base 11 is for instance mounted on the floor. When the cycle is a motorcycle, the foot support is a foot peg (not shown).

A frame 12 is connected to the base 11. The frame has a horizontal longitudinal axis parallel to the base 11, and supports the various user interface components of the bicycle 10, namely the crank set 14, the seat 16 and the handlebar 18.

The exercise wheel 13 is related to the crank set 14. The power output of the user of the bicycle 10 is typically measured using the exercise wheel 13. The exercise wheel 13 is also actuated to control the resistance to pedaling. Other means for providing pedaling resistance could be used. The crank set 14 has pedals (not shown) and receives the pedaling actuation from the user of the bicycle 10. The pivot axis of the crank set 14 relates to the pivot axis of a crank set of a bicycle pivotally disposed in the bicycle frame.

The seat 16 supports the user of the bicycle 10 in a riding position. The handlebar 18 is provided as a support for the arms of the user (and is obviously used for steering on a real bicycle).

The frame 12 has a support beam 20 by which it is connected to the base 11. The support beam 20 has a chain stay 21, and the exercise wheel 13 is mounted within the chain stay 21 in a rotational relation. Although not shown, a chain/chain ring and gears, belt/pulleys or similar transmissions are provided between the wheel 13 and the crank set 14 for the transmission of the pedaling power of the user to the wheel 13.

A rail 22 is supported by the support beam 20. In an embodiment, the rail 22 is generally parallel to the ground. A carriage 23 is slidingly mounted onto the support beam 20, so as to form a prismatic joint therewith (i.e., translational one-DOF joint). As it is supported by the carriage 23, the seat 16 is displaceable in translation along the X-axis. The prismatic joint formed by the rail 22 and the carriage 23 is actuated by actuator 24.

A seat tube 25 is connected to the carriage 23 and in an embodiment is in a perpendicular relation therewith. A seat post support 26 is telescopically engaged into the seat tube 25, so as to form another prismatic joint. As the seat post of the seat 16 is locked to the seat post support 26, the seat is displaceable in translation along the Y-axis. The prismatic joint formed by the seat tube 25 and the seat post support 26 is actuated by actuator 27.

The handlebar 18 is also displaceable in translation along the X-axis and the Y-axis. More specifically, a carriage 30 supporting the handlebar 18 is operatively mounted to a front end of the rail 22, thereby forming a prismatic joint. The direction of the carriage 30 is along the X-axis. In the illustrated embodiment, the displacement of the handlebar 18 along the X-axis is actuated by actuator 31.

A head tube 32 is mounted to the carriage 30, and in an embodiment, is in a perpendicular relation therewith. A bracket 33 is telescopically inserted into the head tube 32 so as to form a prismatic joint displaceable along the Y-axis direction. Actuator 34 powers the prismatic joint along the Y-axis direction.

Although the actuators 24, 27, 31 and 34 are preferably electrically powered linear actuators, it is contemplated to use either stepper motors or manual actuation as well. The translational degrees of freedom of the seat 16 and of the handlebar 18 are mechanically controlled and self-supported/self-locked such that actuation is required to displace the seat 16 and/or handlebar 18. In the illustrated embodiments, the seat 16 and handlebar 18 are therefore fixed into X and Y positions, and can only be displaced by actuation of the prismatic joints. Therefore, the seat 16 and the handlebar 18 are displaceable even while a rider is supported in a riding position.

The bracket 33 is a quick-release mechanism allowing different handlebars 18 to be mounted rapidly onto the stationary bicycle 10. Alternatively, a handlebar extendable in a Z-axis (perpendicular to both the X- and Y-axes according to an orthogonal set of X-Y-Z axes) could be used.

Although not shown, the crank set 14 is preferably of the extendable type, in that the cranks can be adjusted to different lengths. One contemplated crank set system has the cranks pivotally off-center from the chain ring, so as to be adjustable to different crank lengths.

Various sensors are provided in order to measure the performance of the rider on the stationary bicycle 10. For instance, referring to FIG. 5, a power sensor 40 and a cadence sensor 41 are respectively provided in association with the exercise wheel 13 and the crank set 14 to measure the pedaling power and the cadence of a rider. Other configurations for these sensors, and for other sensors 42, are considered, such as a heart-rate monitor, pressure sensors for the pedals, etc.

Figure 4:
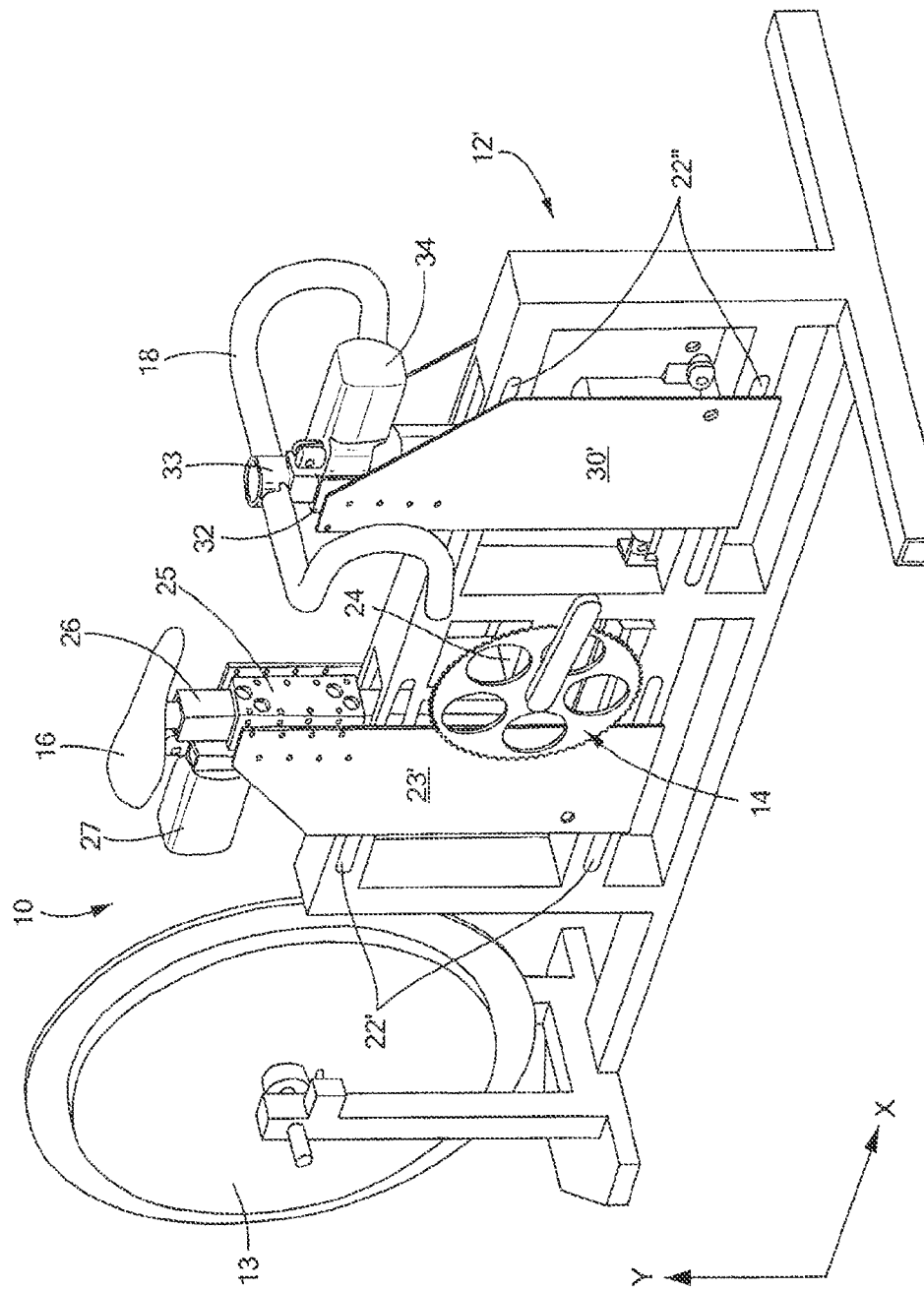
FIG. 4 is a front perspective view of another prior art adjustable stationary bicycle.

The stationary bicycle 10 can take different configurations to enhance its stiffness. Referring to FIG. 4, another prior art stationary bicycle is illustrated as 10, but features a frame 12' that is different than the frame 12 of the prior art stationary bicycle of FIGS. 1 to 3. Many components are similar between the stationary bicycles 10 of FIGS. 1-3 and of FIG. 4, whereby like parts will bear like reference numerals. The frame 12' has a pair of guideways 22' supporting the carriage 23', such that the carriage 23' is displaceable in translation along the X-axis, enabling the horizontal adjustment of the seat 16. The carriage 23' consists of a pair of parallel plates that support the seat tube 25. Similarly, the frame 12' has a pair of guideways 22" supporting the carriage 30', such that the carriage 30' is displaceable in translation along the X-axis, further enabling the horizontal adjustment of the seat 16. The carriage 30' consists of a pair of parallel plates that support the head tube 32. The configuration of the frame 12' (FIG. 4), although similar in construction to the frame 12 (FIG. 1-3), provides added structural rigidity to the stationary bicycle 10. Alternative frame configurations are considered as well.

An improved embodiment of an adjustable stationary bicycle is shown in FIGS. 14-30. This improved embodiment may be used with the system and processes described herein as well as with the camera system embodiment for collecting anthropomorphic data for both initial setup and in real-time to make adjustments. For clarity, reference numerals referring to this embodiment will be prefaced with the letter "B." Referring now to the drawings an adjustable stationary bicycle in accordance with this embodiment of the invention is generally shown at B28. The stationary bicycle B28 generally has a base B30, a frame B40, a wheel B82, a crank set B46, a seat B134 and handlebars B138. The frame B40 has a horizontal longitudinal axis parallel to the base B30.

The base B30 supports the bicycle B28. The base B30 can be mounted on the floor or is otherwise sufficiently sturdy to bear the weight and movement of the bicycle B28 and the rider. As best shown in FIGS. 14-20, the base B30 includes a base column B32 with base legs B34 at either end thereof.

A frame B40 is connected to the base B30 via clevis B36. In the embodiment shown, frame B40 includes two side panel members with a center frame column B42 (see FIG. 21) there between. A top guard B44 covers the top area over the open area between the two side panels. The clevis B36 is formed from two side panels connected to the base column B32. Center frame column B42 is pivotally connected to clevis B36 at clevis pivot B38 so that, as the center frame column B42 pivots, the frame B40 tilts the bicycle B28 forward or backward to simulate an uphill or downhill riding position.

As best shown in detail in FIGS. 21-24, the tilting of the frame B40 is accomplished using a base actuator B56 within the base column B32. The base actuator B56 includes a motor B60 operatively connected to a ballscrew B58. The connection may be direct, via gearing, belt drive, or otherwise. Engaged to the ballscrew B58 is a ball nut B64 that is attached to a pivotable yoke block B62 at the end of the center frame column B42. The motor B60 selectively rotates the ballscrew B58 so as to move the ball nut B64 along its length. As the ball nut B64 moves, it causes movement of the yoke block B62 at the end of the center frame column B42 thereby causing the center frame column B42 (with frame B40 attached) to pivot about clevis pivot B38. Thus, activation of the motor B60 in the base actuator B56 can tilt the frame B40 forward or backward to simulate for the rider of the bicycle B28 the feeling of riding uphill or downhill. This feeling is enhanced by appropriate modification of the resistance provided to pedaling, as described below.

The frame B40 supports the various user interface components of the bicycle B28, namely the crank set B46, the chain stay B50 (with chain B52 between the crank set and the wheel B82 supported by the chain stay B50), the seat B134 and the handlebars B138. A mount B100 for a resistance/measuring device B142 is attached to the chain stay B50 or frame B40 for interaction with wheel B82.

The wheel B82 is connected to the crank set B46 via chain B52 or other means such as a belt drive so as to result in rotation of the wheel B82 when pedals (not shown) attached to the crank set B46 are actuated by a rider. The power output of the user of the bicycle B28 is typically measured using the wheel B82 through a resistance and measuring device B142 as is well known in the art. Alternatively, resistance and power output measurement could be provided directly at the crank set B46 but it has been found preferable to use a rotating wheel B82 for enhanced user experience.

Figure 18:
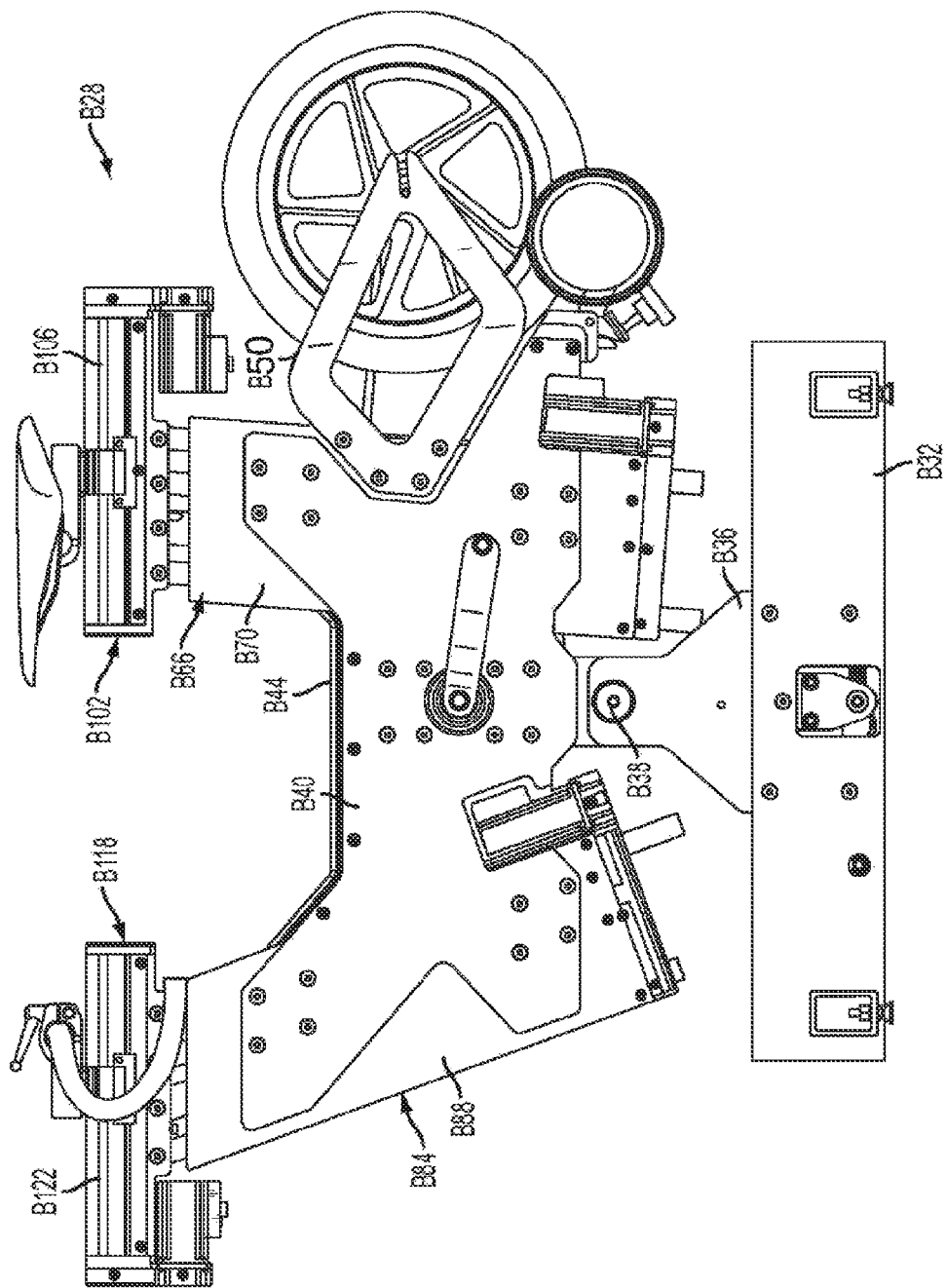
FIG. 18 is a right side view of the adjustable stationary bicycle of FIG. 14.
Figure 19:
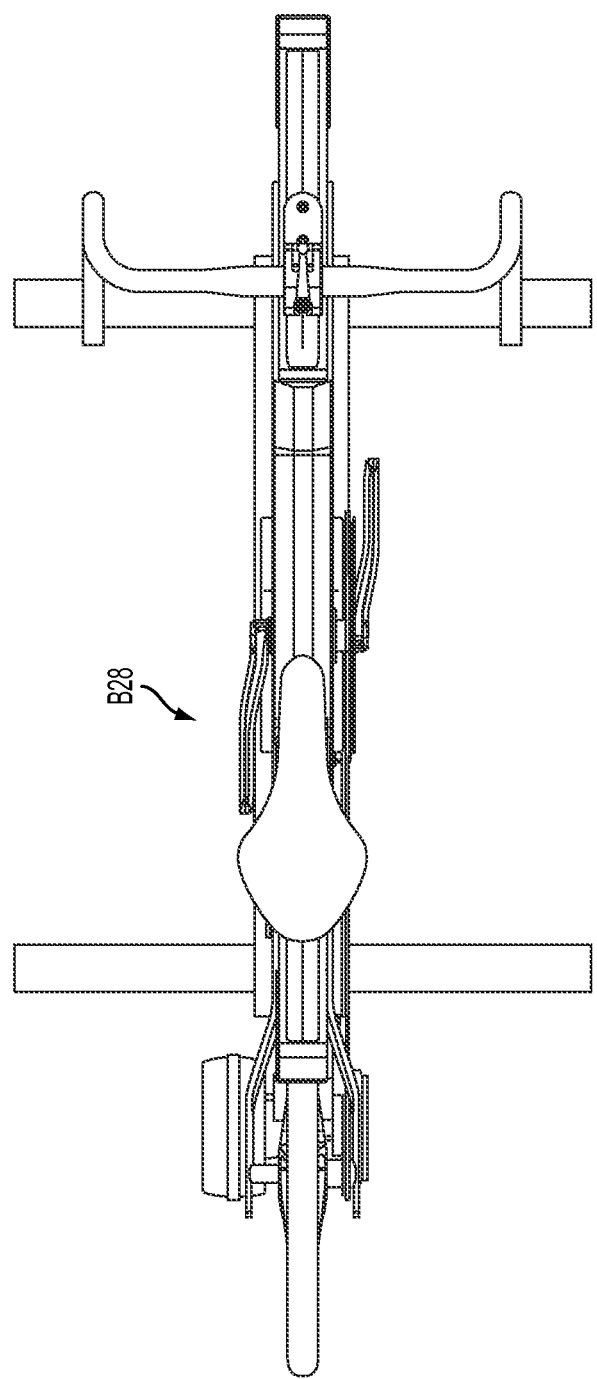
FIG. 19 is a top view of the adjustable stationary bicycle of FIG. 14.
Figure 20:
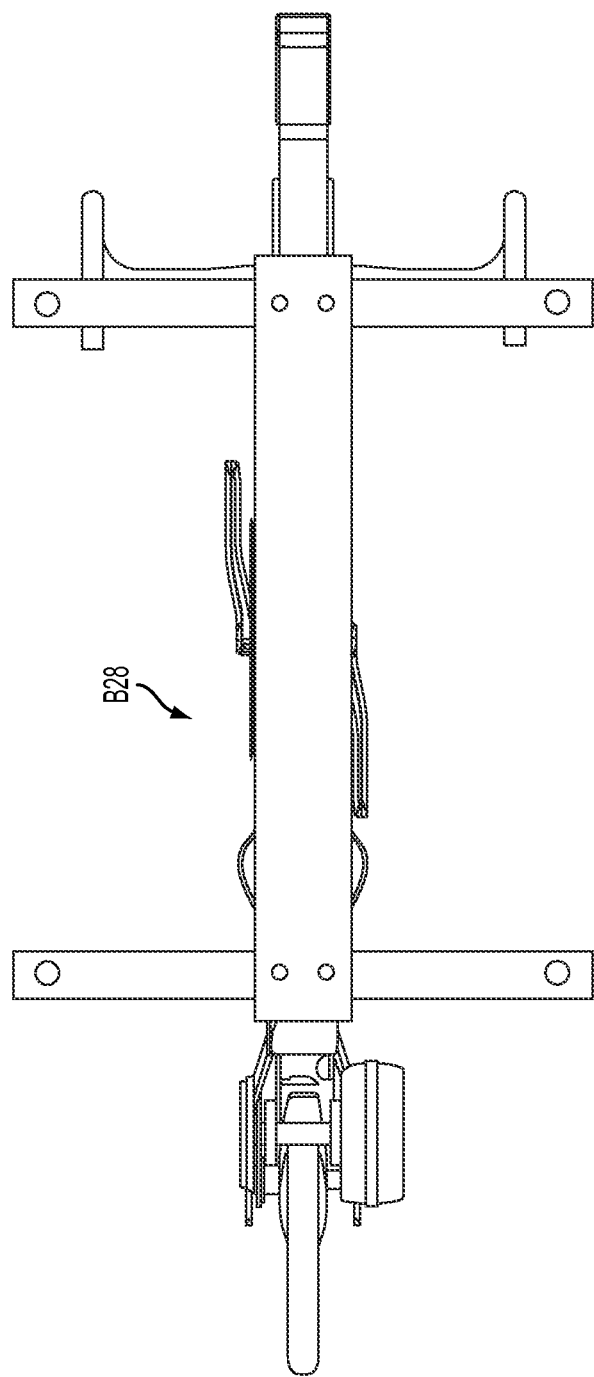
FIG. 20 is a bottom view of the adjustable stationary bicycle of FIG. 14.
Figure 21:
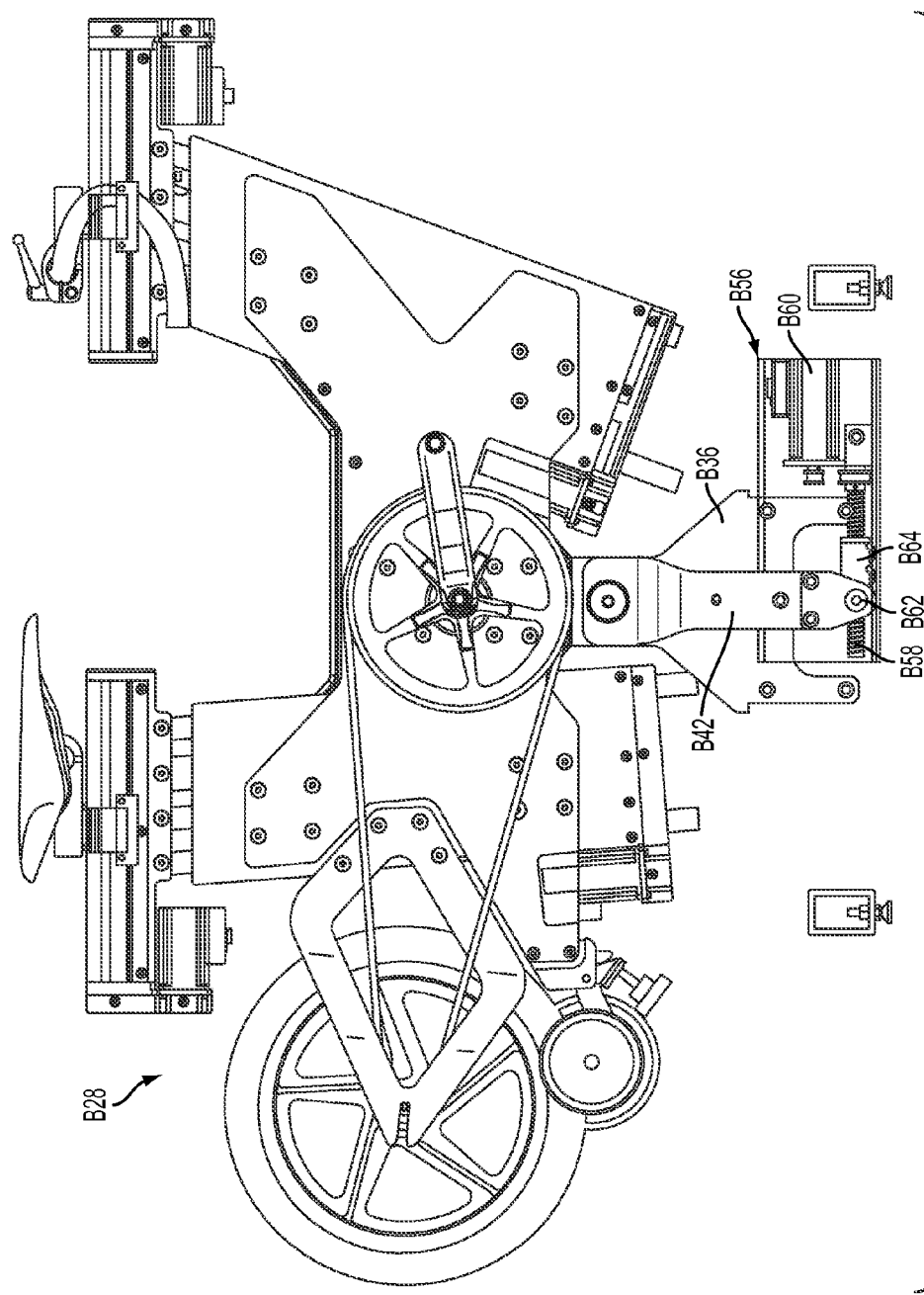
FIG. 21 is a left side view of the adjustable stationary bicycle of FIG. 14 shown with the base column removed.
Figure 22:
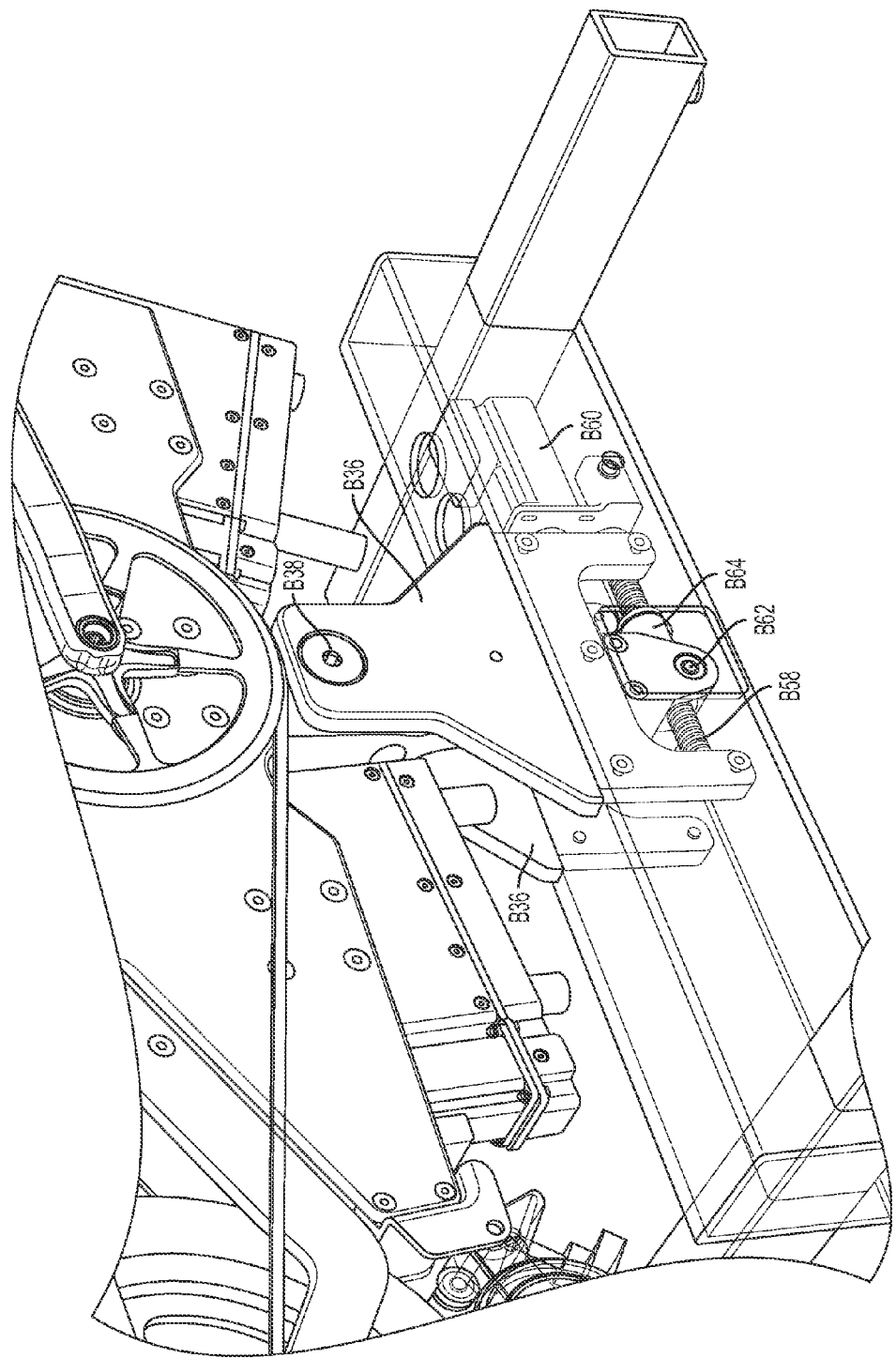
FIG. 22 is a detail left side perspective view of the adjustable stationary bicycle of FIG. 14 shown with the base column semitransparent to reveal interior detail.
Figure 23:
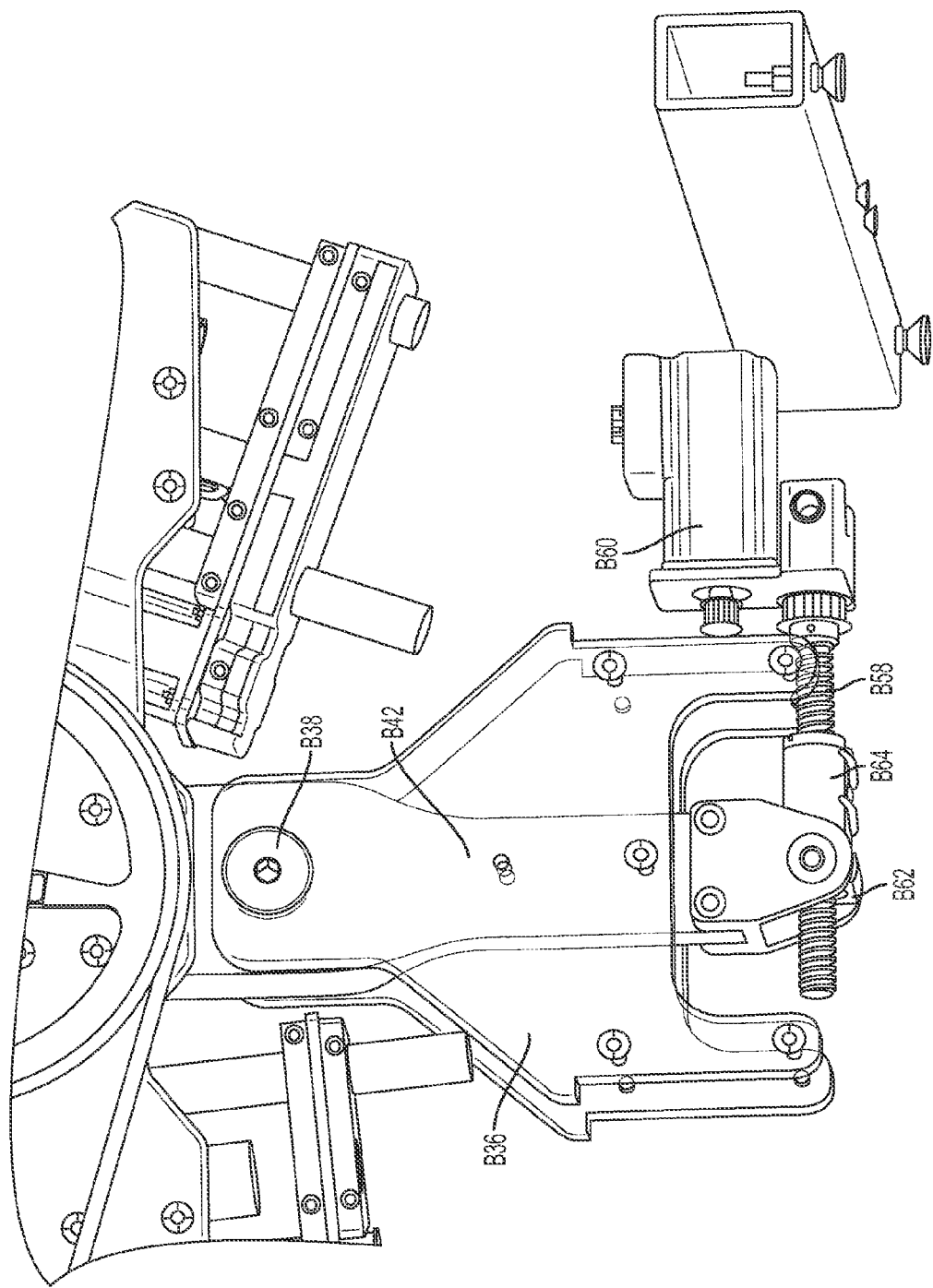
FIG. 23 is a detail left side view of the adjustable stationary bicycle of FIG. 14 shown with the base column, seat actuator housing, and handlebar actuator housing removed to reveal interior detail.
Figure 24:
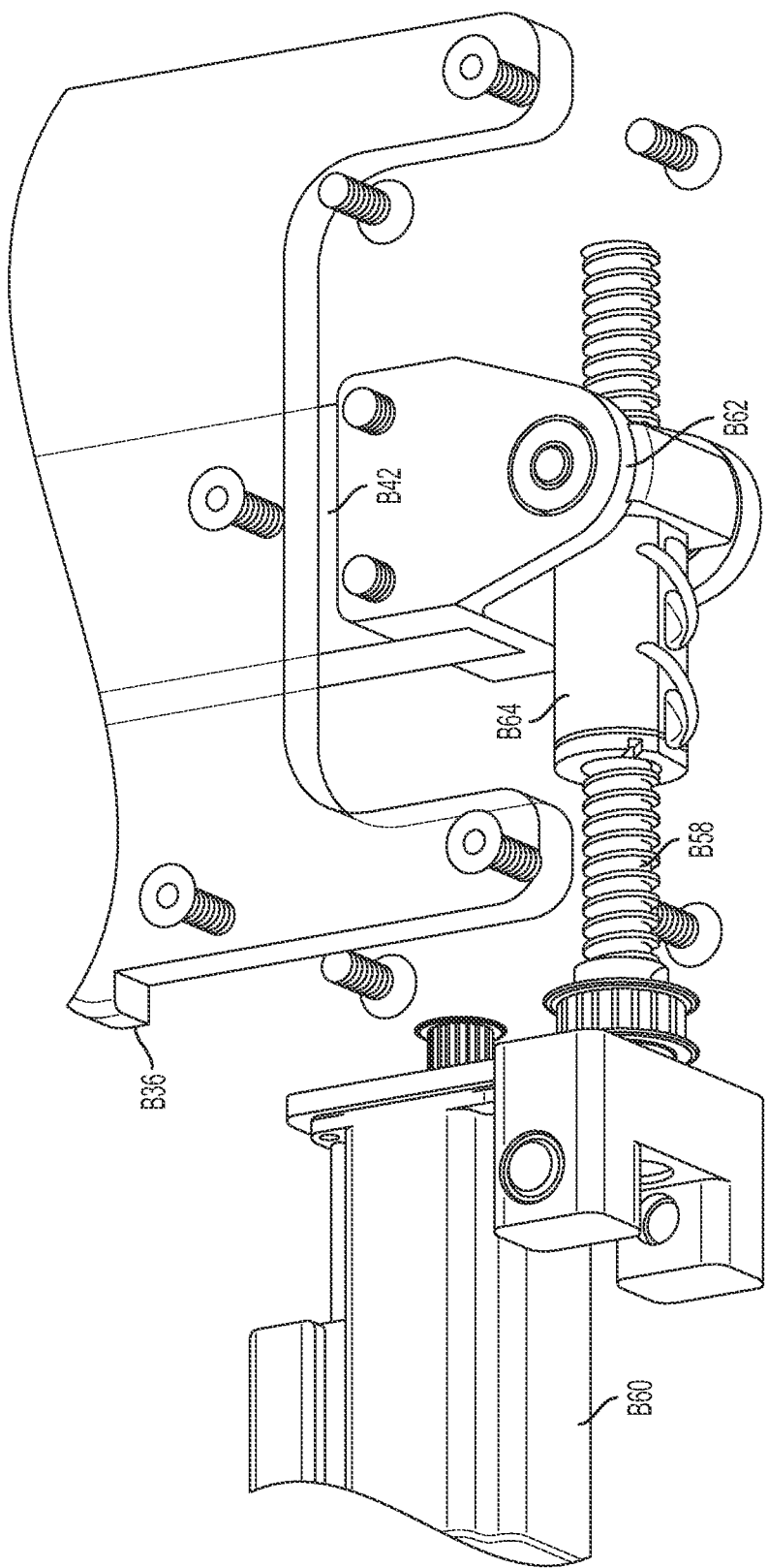
FIG. 24 is a detail view of FIG. 22.
Figure 25:
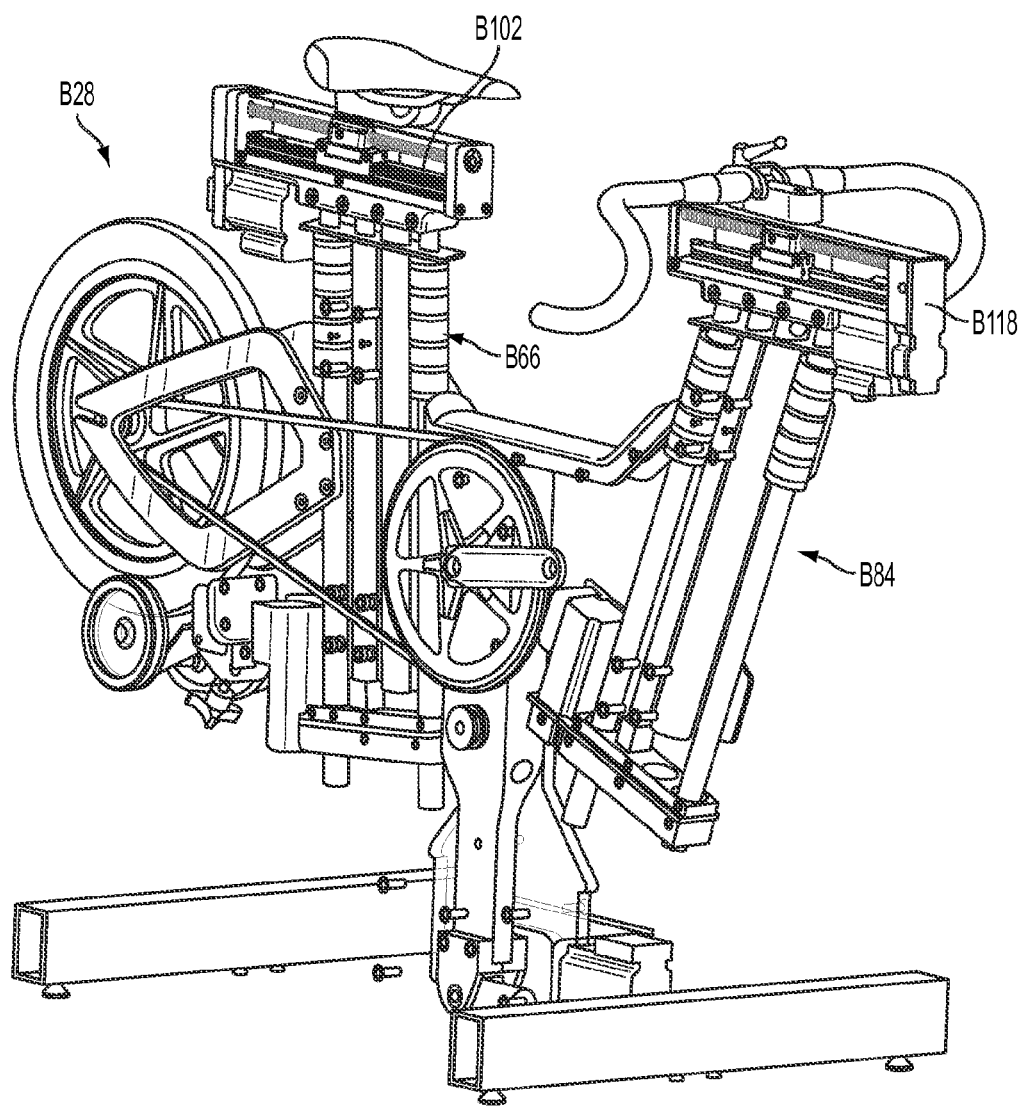
FIG. 25 is a perspective view of the adjustable stationary bicycle of FIG. 14 shown with several housings and covers removed to reveal interior detail.

The seat B134 supports the user of the bicycle B28 in a riding position. As shown in detail in FIG. 17 and generally in FIGS. 32, 33, and 26, the seat B134 is attached to the frame B40 through seat slide assembly B102. Seat B134 is attached to a seat clamp B136 which is preferably a quick-release seat clamp to enable quick changing of the seat B134. The seat clamp B136 is attached to the seat slide assembly B102 via traveler B112 on carriage B110 that slidingly rests on rail B108. Carriage B110 can slide along the length of rail B108 which is affixed to the base B104 of the seat slide assembly B102. Motor B116 of the seat slide assembly B102 is operably attached to rotatable rod B114. The connection may be direct, via gearing, belt drive, or otherwise. When motor B116 is activated it causes rotation of rod B114 which is threadingly engaged to traveler B112. Because of the threaded engagement and non-rotatable securing of traveler B112 to carriage B110, rotation of the rod B114 causes the traveler 112 to move along the length of the rod B114 and movement of the seat B134. As best seen in FIG. 18, cover B106 is provided to cover the seat slide assembly B102.

The handlebars B138 are provided as a support for the arms of the user. As shown in detail in FIG. 29 and generally in FIGS. 32, 33, and 36, the handlebars B138 are attached to the frame B40 through handlebar slide assembly B118. Handlebars B138 are attached to a handlebar clamp B140 which is preferably a quick-release clamp to enable quick changing of the handlebars B138. The handlebar clamp B140 is attached to the handlebar slide assembly B118 via traveler B128 on carriage B126 that slidingly rests on rail B124. Carriage B126 can slide along the length of rail B124 which is affixed to the base 120 of the handlebar slide assembly 118. Motor 132 of the handlebar slide assembly B118 is operably attached to rotatable rod B130. The connection may be direct, via gearing, belt drive, or otherwise. When motor B132 is activated it causes rotation of rod B130 which is threadingly engaged to traveler B128. Because of the threaded engagement and non-rotatable securing of traveler B128 to carriage B126, rotation of the rod B130 causes the traveler B128 to move along the length of the rod B130 and movement of the handlebars B138. As best seen in FIG. 18, cover B122 is provided to cover the handlebar slide assembly B118.

Figure 26:
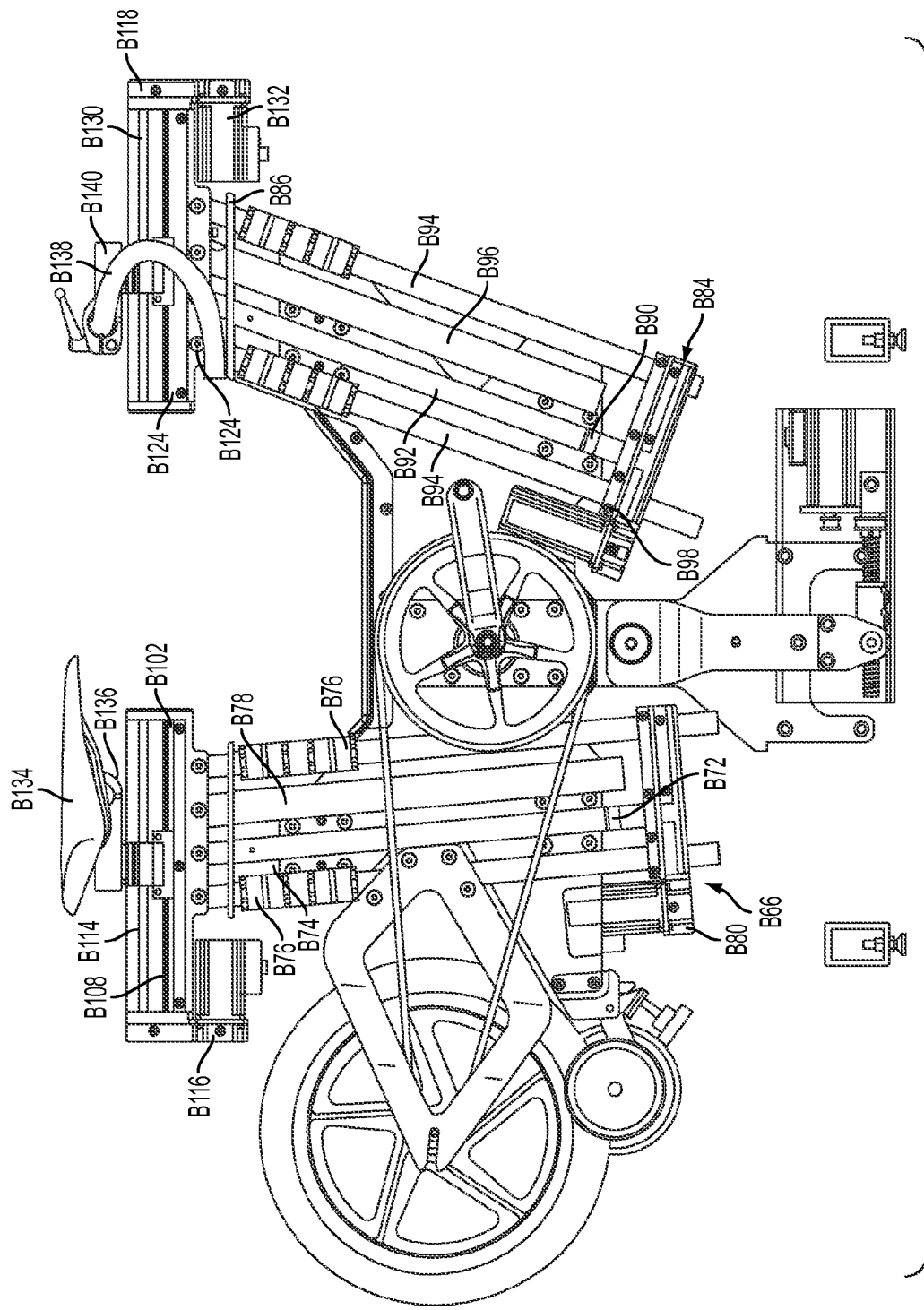
FIG. 26 is a left side view of the adjustable stationary bicycle of FIG. 14 shown with several housings and covers removed to reveal interior detail.
Figure 27:
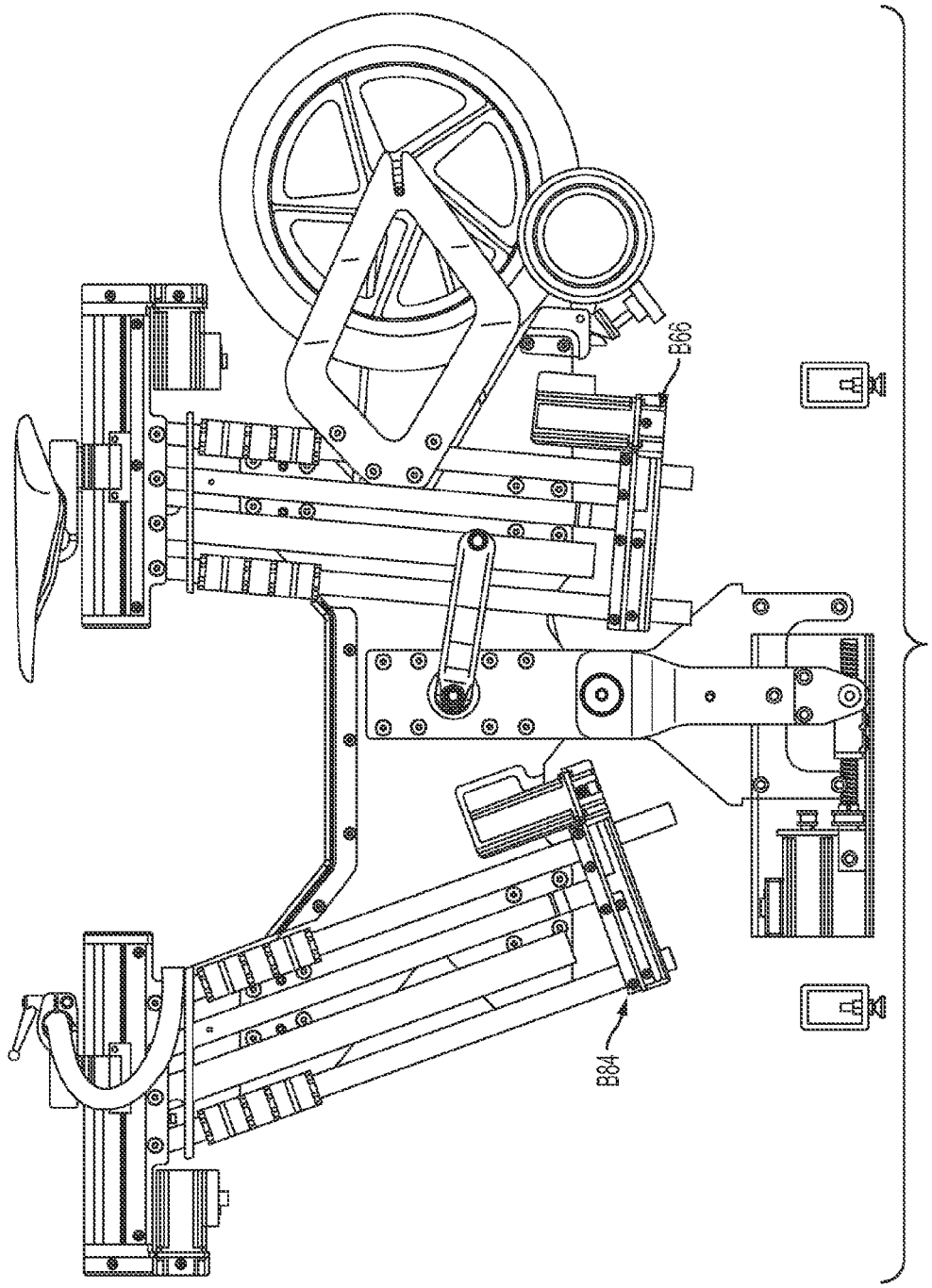
FIG. 27 is a right side view of the adjustable stationary bicycle of FIG. 14 shown with several housings and covers removed to reveal interior detail.
Figure 28:
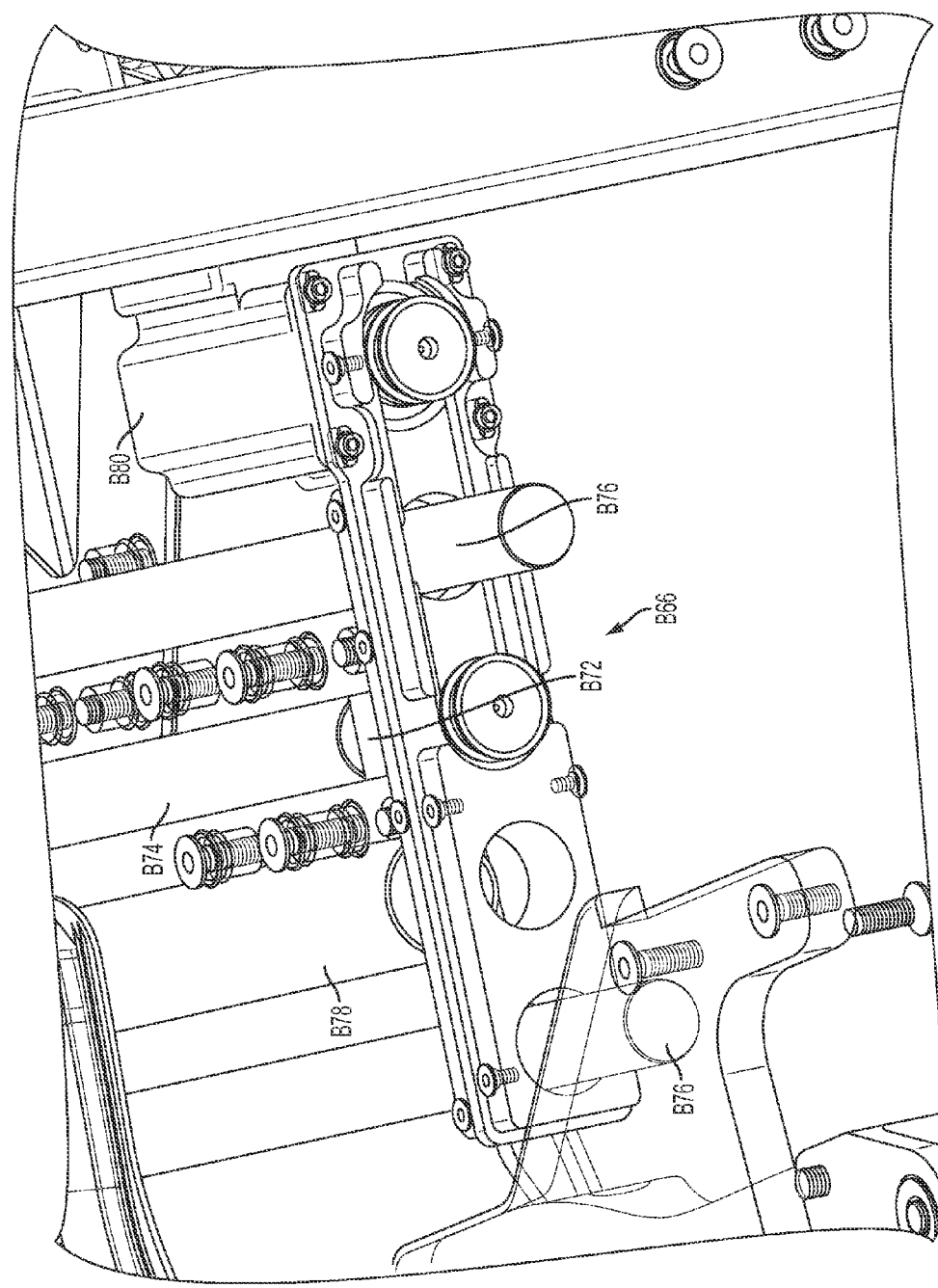
FIG. 28 is a detail bottom perspective view of the seat actuator shown with several housings and covers removed to reveal interior detail.
Figure 29:
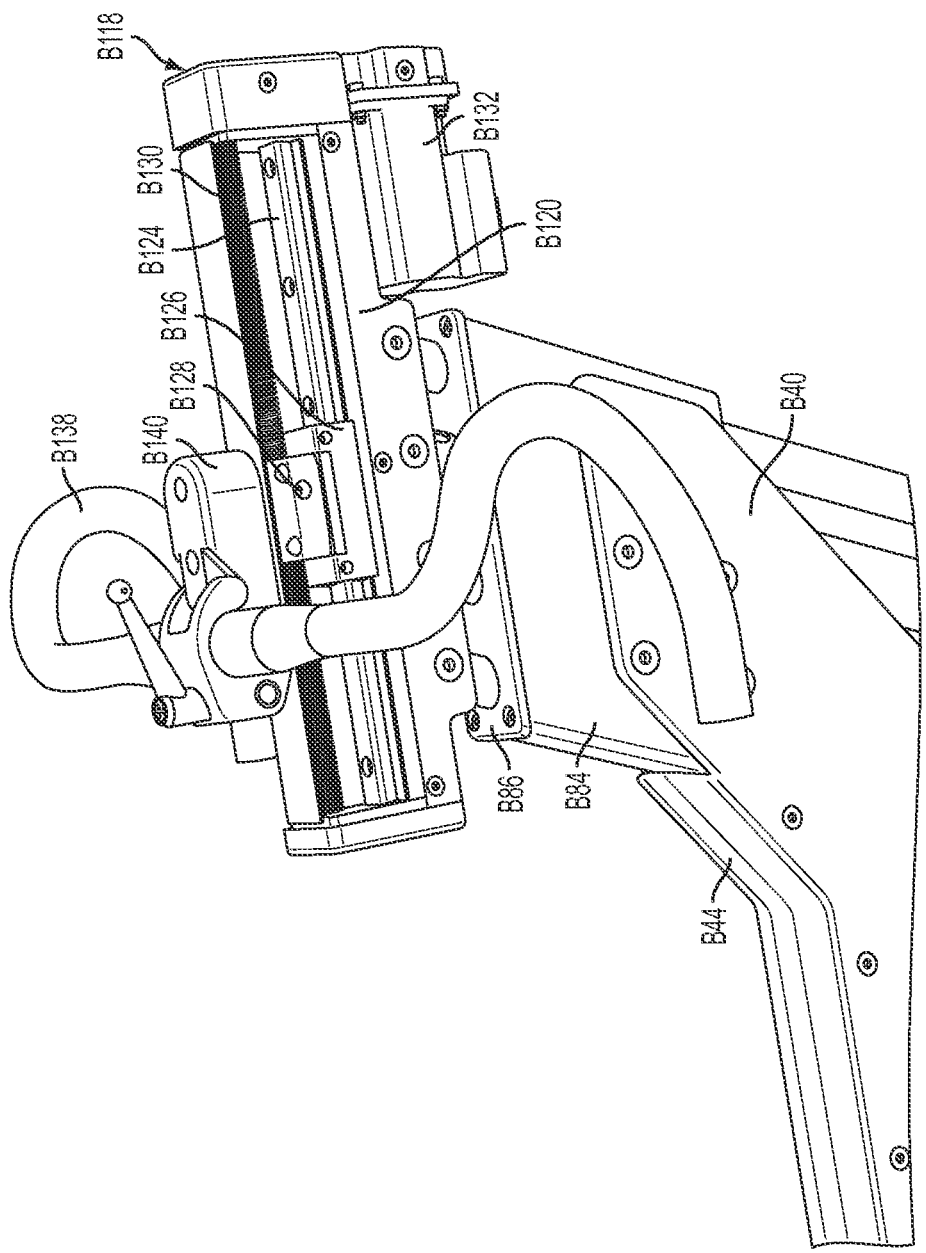
FIG. 29 is a detail top perspective view of the handlebar slide assembly shown with the cover removed to reveal interior detail.
Figure 30:
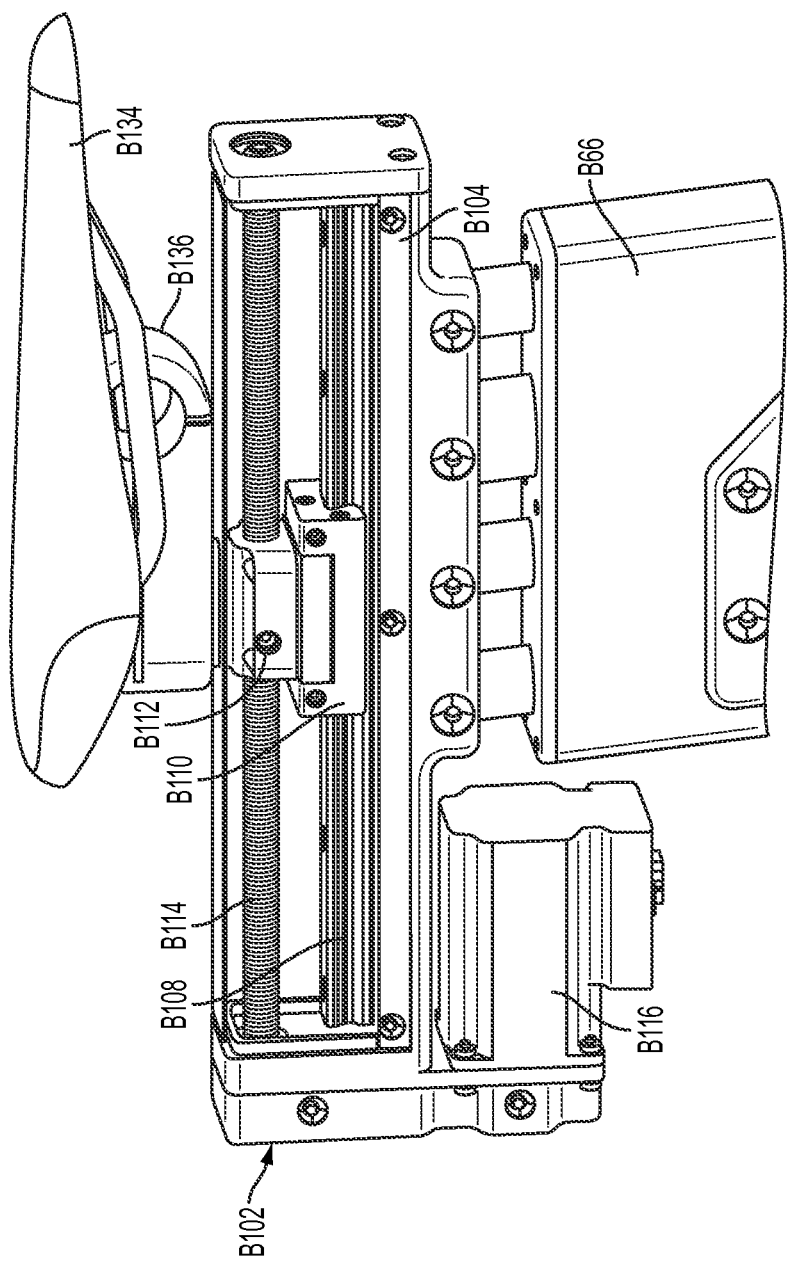
FIG. 30 is a detail top perspective view of the seat slide assembly shown with the cover removed to reveal interior detail.

As shown generally in FIGS. 14, 15, 18, and 25 and in more detail in FIGS. 26-28, seat actuator B66 is positioned on frame B40. Seat actuator B66 provides a moveable platform on which seat slide assembly B102 is positioned. Seat actuator B66 includes, extending through a top guide B66 that helps maintain them in position, rods B76 for providing stability to the assembly, shaft B74 for effectuating movement, and cable tube B78 for routing of the various control and power cables needed for the motors, measuring devices, etc. A ball screw B72 is threadingly positioned at the end of shaft B74. Motor B80 of the seat actuator B66 is operably attached to shaft B74. The connection may be direct, via gearing, belt drive, or otherwise. Because of the threaded connection between the shaft B74 and the ball screw B72, when ball screw B72 is caused to rotate, shaft B74 moves along its length causing the top end of the seat actuator B66 (on which the seat slide assembly B102 is affixed) to move thereby repositioning the seat B134. As best illustrated in FIG. 28, as shaft B74 moves, rods B76 (whose primary purpose is to provide stability) slide within the seat actuator B66. As best seen in FIG. 18, housing B70 covers the various moving parts comprising the seat actuator B66.

As shown generally in FIGS. 14, 15, 18, and 25 and in more detail in FIGS. 26-27, handlebar actuator B84 is positioned on frame B40. Handlebar actuator B84 provides a moveable platform on which handlebar slide assembly B118 is positioned. Handlebar actuator B84 includes, extending through a top guide B86 that helps maintain them in position, rods B94 for providing stability to the assembly, shaft B92 for effectuating movement, and cable tube B96 for routing of the various control and power cables needed for the motors, measuring devices, etc. A ball screw B90 is threadingly positioned at the end of shaft B92. Motor B98 of the handlebar actuator B84 is operably attached to shaft B92. The connection may be direct, via gearing, belt drive, or otherwise. Because of the threaded connection between the shaft B92 and the ball screw B90, when ball screw B90 is caused to rotate, shaft B92 moves along its length causing the top end of the handlebar actuator B83 (on which the handlebar slide assembly B118 is affixed) to move thereby repositioning the handlebars B138. The movement of the handlebar actuator B84 is similar to that illustrated in FIG. 28 with respect to the seat actuator B66. As best seen in FIG. 18, housing B88 covers the various moving parts comprising the handlebar actuator B84.

As best seen in FIG. 26, the seat actuator B66 is angled relative to perpendicular to the frame horizontal axis, and the handlebar actuator B83 is angled relative to perpendicular to the frame horizontal axis.

Thus, the coordinated and controlled activation of the motor B60 of the base actuator B56, the motor B80 of the seat actuator B66, the motor B98 of the handlebar actuator B84, the motor B116 of the seat slide assembly, and the motor B132 of the handlebar slide assembly enables the power tilting of the frame B40, and X-Y adjustment of the positions of the seat B134 and handlebars B138. In other embodiments, other methods of power tilting (not shown) can be used.

Although the motors are preferably stepper motors, electrically powered linear actuators, hydraulic actuators, and/or other types of motors or manual actuation could be used as well. The translational degrees of freedom of the seat B134 and of the handlebars B138 are mechanically controlled and self-supported/self-locked such that actuation of the motors is required to displace the seat B134 and/or handlebars B138. In the illustrated embodiment, the seat B134 and handlebars B138 are therefore fixed into X and Y positions, and can only be displaced by activation of the actuators.

Various sensors are provided in order to measure the performance of the rider on the bicycle B28. For instance, referring to FIG. 15, a power sensor and a cadence sensor can be provided in association with the wheel B82 and the crank set B46 to measure the pedaling power and the cadence of a rider. In the illustrated embodiment such sensors are part of the resistance/measuring device B142. Other configurations for these sensors, and other sensors, are considered, such as a heart-rate monitor, pressure sensors for the pedals, etc. For example, pressure sensors for all contact points of the rider (pedals, seat, handlebars) could be included.

Figure 5:
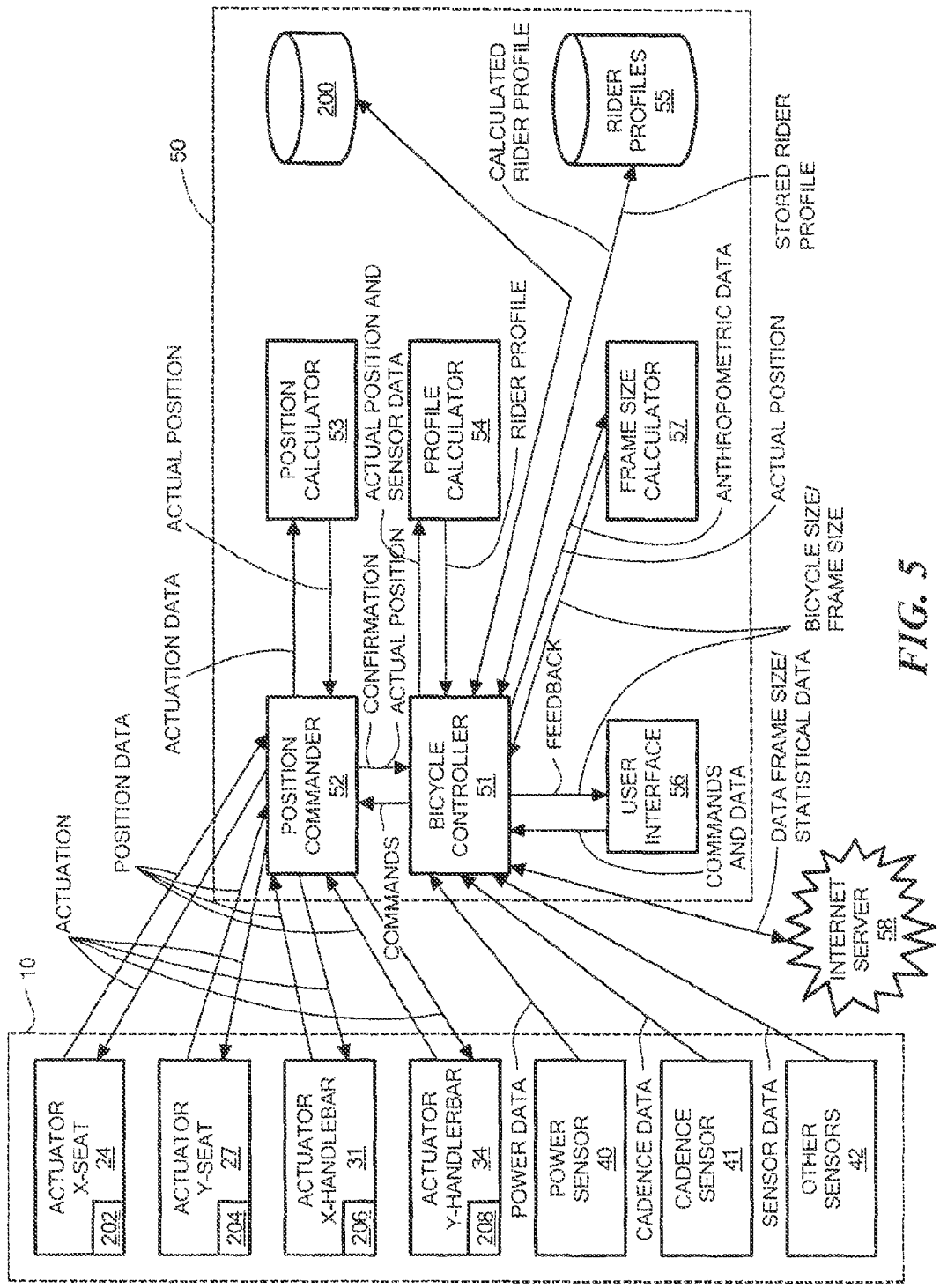
FIG. 5 is a block diagram of a bicycle controller system used in combination with the adjustable stationary bicycle of FIGS. 1 and 4.

Referring to FIG. 5, a stationary bicycle controller system in accordance with an embodiment is generally shown at 50. The bicycle controller system 50 is used in all illustrated bicycle configurations, and is in communication with the actuators 24, 27, 31 and 34, as well as with the sensors 40, 41 and 42. The bicycle controller system 50 has a bicycle controller 51 that is a processing unit (PC, microprocessor, or the like). The bicycle controller 51 receives data from the power sensor 40, the cadence sensor 41 and the other sensors 42. In the embodiment wherein a camera is used to collect anthropomorphic data described below, the camera is also connected to the bicycle controller 51.

A position commander 52 is connected to the bicycle controller 51, and is in association with the actuators 24, 27, 31 and 34. More specifically, the actuation of the actuators 24, 27, 31 and 34 is controlled by the commander 52. A position calculator 53 is connected to the position commander 52 and determines the position of the seat 16 and the handlebar 18 in the X-Y coordinate system illustrated in FIGS. 1 to 3.

As an example, a reference point for the X and Y coordinates of the seat 16 and the handlebar 18 is a center of the crank set 14, which correlates with the center of the foot support of a bicycle frame. Considering that the feet of the rider are locked to the cranks of the crank set 14, the center of the crank set 14 constitutes a fixed point well suited to be used as a reference for the position of the seat 16 and the handlebar 18.

The position calculator 53 may operate in different ways. For instance, in an embodiment a calibration is performed every time the stationary bicycle 10 is turned on, so as to relate the degree of actuation of the actuators 24, 27, 31 and 34 to X and Y positions relative to the reference. In an embodiment, the actuators 24, 27, 31 and 34 are subjected to a homing movement (moved to a null extension) to be calibrated. Alternatively, sensors 202, 204, 206, 208 (see FIG. 5) may be provided in the actuators 24, 27, 31 and 34, or on the various prismatic joints, so as to detect the XY positions of the seat 16 and the handlebar 18 with respect to the reference. The use of sensors is considered for manually actuated mechanisms of displacements for the seat 16 and the handlebar 18.

A profile calculator 54 is connected to the bicycle controller 51. The profile calculator 54 receives the various data from the sensors 40-42, as well as the X and Y positions of the seat 16 and the handlebar 18, as a function of time. Accordingly, the performance of the rider (pedaling power, cadence, heart rate, for example) is related to the dimensions of the stationary bicycle 10. All information is related to rider identification and characteristics (e.g., name, anthropometric measurements, weight, age, etc.) in the form of a rider profile in a rider profile database 55. Additional information can be recorded under the rider profile, such as the preferred dimensions of the stationary bicycle 10.

A user interface 56 is connected to the bicycle controller 51. The user interface 56 is typically a monitor with touch keys or a keyboard, through which the user interface 56 is commanded and information is entered (e.g., rider identification). In an embodiment, the user interface 56 displays actuator controls, for the manual control of the actuation of the actuators 24, 27, 31 and 34. It is considered to provide a touch-screen with icons representing available directions of displacement for the seat 16 and the handlebar 18. The user interface 56 may include other peripherals, such as a printer, ports for plug-in devices (e.g., USB port), digital camera, etc. Smart cards and chip cards or internal storage can be used to store the rider profile.

Amongst the various applications considered, the use of the stationary bicycle 10 as a training device in a gym setting is contemplated. When a rider wants to use the bicycle 10, his/her identification is entered into the bicycle controller system 50, whereby the rider profile is retrieved from the database 55. The bicycle controller 51 transmits the information to the position commander 52 such that the size of the stationary bicycle 10 is adjusted as a function of the rider identification. In the embodiment wherein a camera is used to collect anthropomorphic data described below, the camera could be used to collect measurements from the rider to adjust the component positions rather than reliance on information from database 55.

Figure 9:
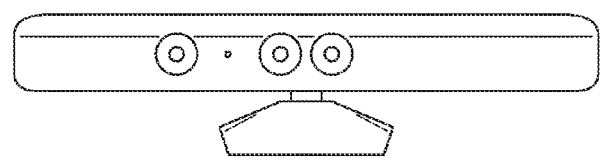
FIG. 9 depicts a camera suitable for use in collecting anthropometric data about a rider.
Figure 10:
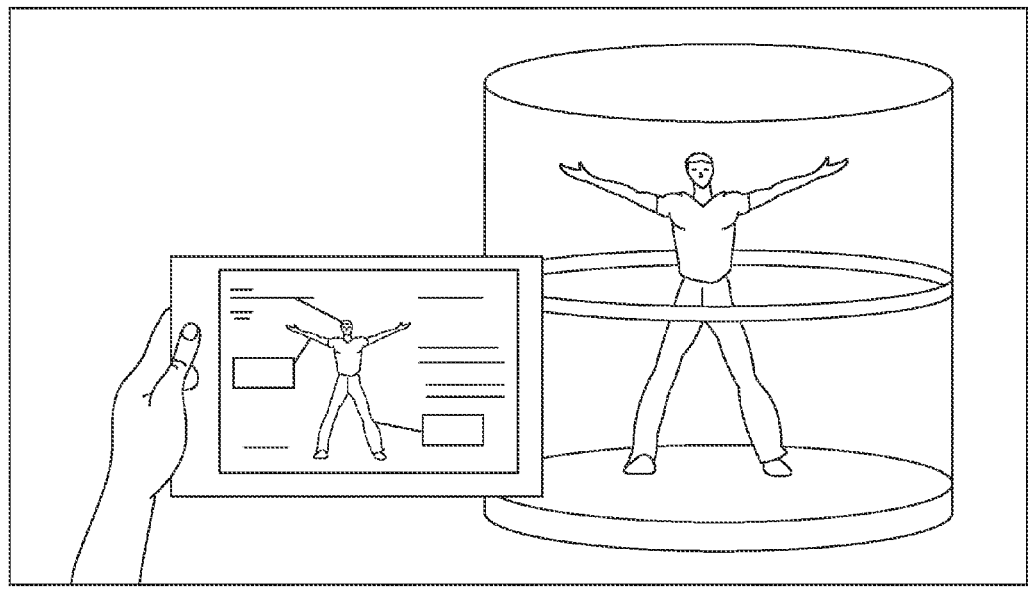
FIG. 10 depicts a rider positioned for collection of anthropometric data through a camera for use in initially configuring the positions of the components of an adjustable stationary bicycle.

For a new user of the stationary bicycle 10, a rider profile is created and saved in the rider profile database 55. It is considered to provide statistical data relating anthropometric data of users to desired bicycle dimensions. Accordingly, by entering anthropometric data pertaining to a user, the bicycle controller 51 can select a suitable bicycle size as a function of the anthropometric data. In the embodiment wherein a camera is used to collect anthropomorphic data described below, the camera can collect the data and transmit it directly to the bicycle controller 51. As described hereinafter, a frame size calculator 57 is used to select a suitable bicycle size from the anthropometric data. Alternatively, from statistical data, formulas can be derived to determine initial bicycle dimensions as a function of anthropometric data. In an embodiment discussed below in connection with method 500 (FIG. 9), the functionality of frame size calculator 57 is expanded to include determination of a best fit bicycle frame, stem, spacer(s), and seat post. Further additional functionality of frame size calculator 57 discussed below includes determination of riding apparel suitable for the person/rider being fitted. As such, the term "frame size calculator" could be replaced with the term "custom calculator," and still be consistent with the description of the invention described herein.

Moreover, the rider profile may include the performance of the rider at different bicycle dimensions. Therefore, an optimal bicycle size can be determined from the review of the information gathered in the database 55 following calculations by the profile calculator 54. This is particularly useful for elite athletes. Alternatively, a trainer can assist the rider in trying different bicycle sizes, to then enter the dimensions, at a position selected by the trainer or the rider.

As another application, the stationary bicycle 10 is used as a fitting apparatus to determine an optimal bicycle size for particular objectives. The stationary bicycle 10 is used with the controller system 50 to gather performance information associated with bicycle size. The use of actuators 24, 27, 31 and/or 34 enables a dynamic fitting. More specifically, the controller system 50 may direct a plurality of incremental changes to have the rider try various adjusted positions while not interrupting his/her pedaling. As an alternative, the rider profile data from the database 55 may then be interpreted to identify the optimal position. With the rider profile, the optimal bicycle size (according to the type of bicycle, such as road bike, mountain bike, cyclo-cross bike, etc.) for the rider can be determined.

When the stationary bicycle 10 is used as part of a fitting apparatus, it is considered to provide the controller system 50 with the frame size calculator 57. The frame size calculator 57 receives the actual position data from the bicycle controller 51 (i.e., the adjusted position following testing by the user), and produces frame size data, and possibly other data such as stem length and angle, spacer combinations, handlebar dimensions, and seat post dimensions. The frame size calculator 57 is also provided to identify initial seat and handlebar positions from the anthropometric data of the user (which can be collected by a camera in one embodiment). The frame size calculator 57 typically selects starting seat and handlebar positions from statistical data relating bicycle size to anthropometric data. For this purpose, the bicycle controller 51 is connected to the internet 58, to access a remotely-located server comprising the statistical data tables associating bicycle/frame sizes to anthropometric data. These statistical data tables are typically updated with any new user recording adjusted bicycle dimensions as a function of anthropometric data. Alternatively, the data could be locally stored in a database to avoid the need for a connection to the internet 58.

The frame size data calculated by the frame size calculator 57 can represent enough information for a user (e.g., salesman) to select a bicycle of correct size. As an example, the X and Y coordinates of the seat and of the handlebars are given with respect to the pivot axis of the crank set, the reference. A tool (e.g., a t-shaped ruler) may then be provided to measure a bicycle to determine whether it has the right size. Accordingly, a store salesman can readily pick bikes from the inventory by having the required dimensions of the bike, and means to measure the bike.

Alternatively, the user interface 56 may produce data in the form of savable files. For instance, the frame size data may be printed out, or saved, to be sent to a supplier or a manufacturer of bicycles. Similarly, the bicycle controller 51 may be connected to the internet 58, so as to forward bike dimensions to a manufacturer of bicycles. In the case of custom-made bicycles, the delay between the fitting of a bicycle is reduced with the use of the controller system 50.

Additional information can be obtained. For instance, it is considered to place the stationary bicycle 10 in a wind tunnel in order to obtain the rider's drag coefficient as a function of the effect of the size of the bicycle on the riding position. This information is then related to the performance of the rider to determine the optimal size of the bicycle for the rider. In the embodiment, where a camera is used to collect real-time anthropomorphic data, the camera could be further used to provide an estimated rider drag coefficient based on the positioning of the rider.

It is also considered to use the stationary bicycle as a motion simulator for video games or riding simulations. The stationary bicycle 10 can provide force feedback in the form of resistance in the exercise wheel 13, as well as through actuation of the actuators 24, 27, 31 and/or 34 to simulate the vibrations of a bicycle. In the embodiment where the frame can be tilted forward and back, the tilting can be used to better simulate uphill and downhill riding conditions.

Figure 6:
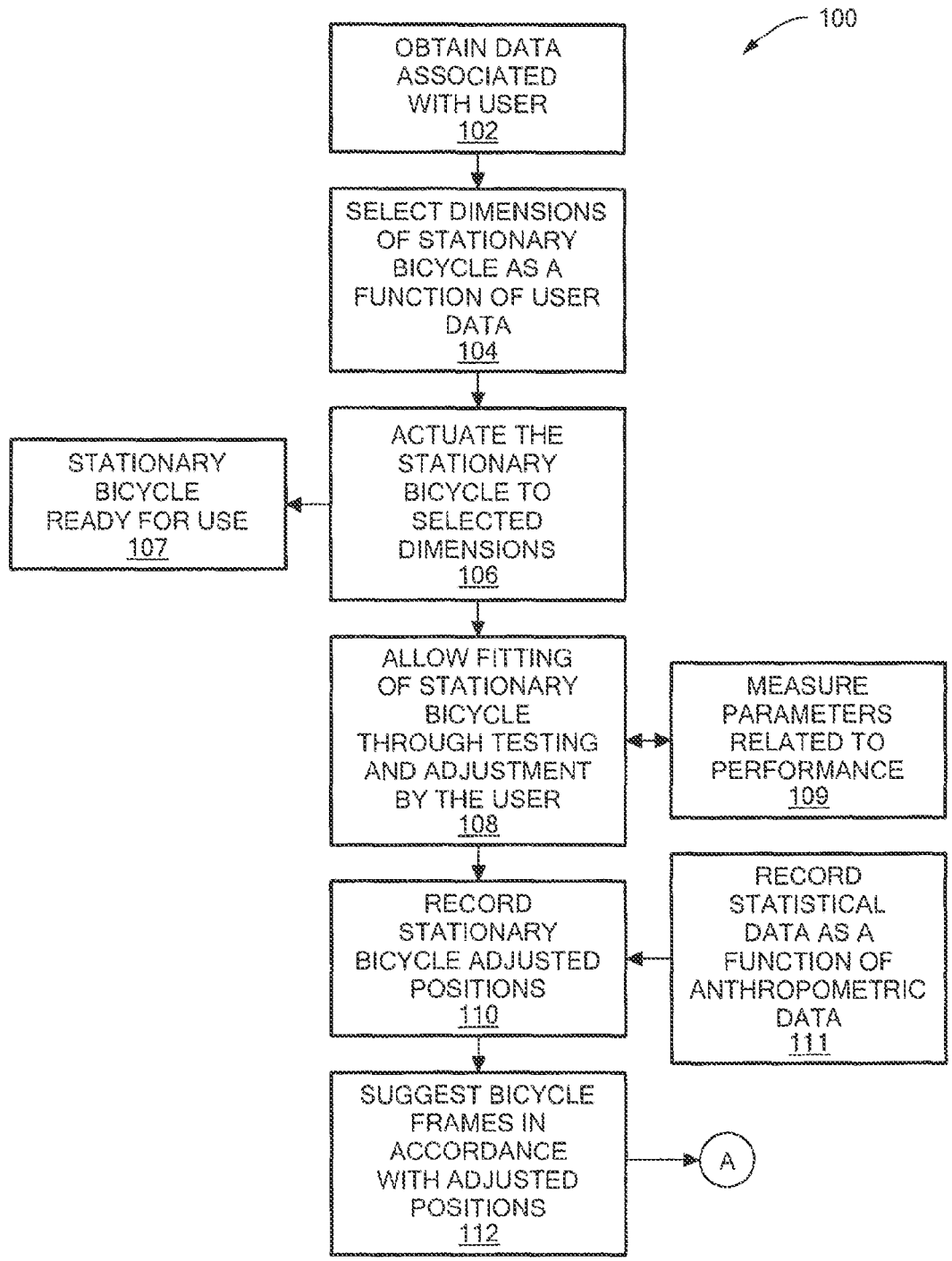
FIG. 6 is a flow chart illustrating a method for adjusting a stationary bicycle in accordance with yet another embodiment of the invention.
Figure 13:
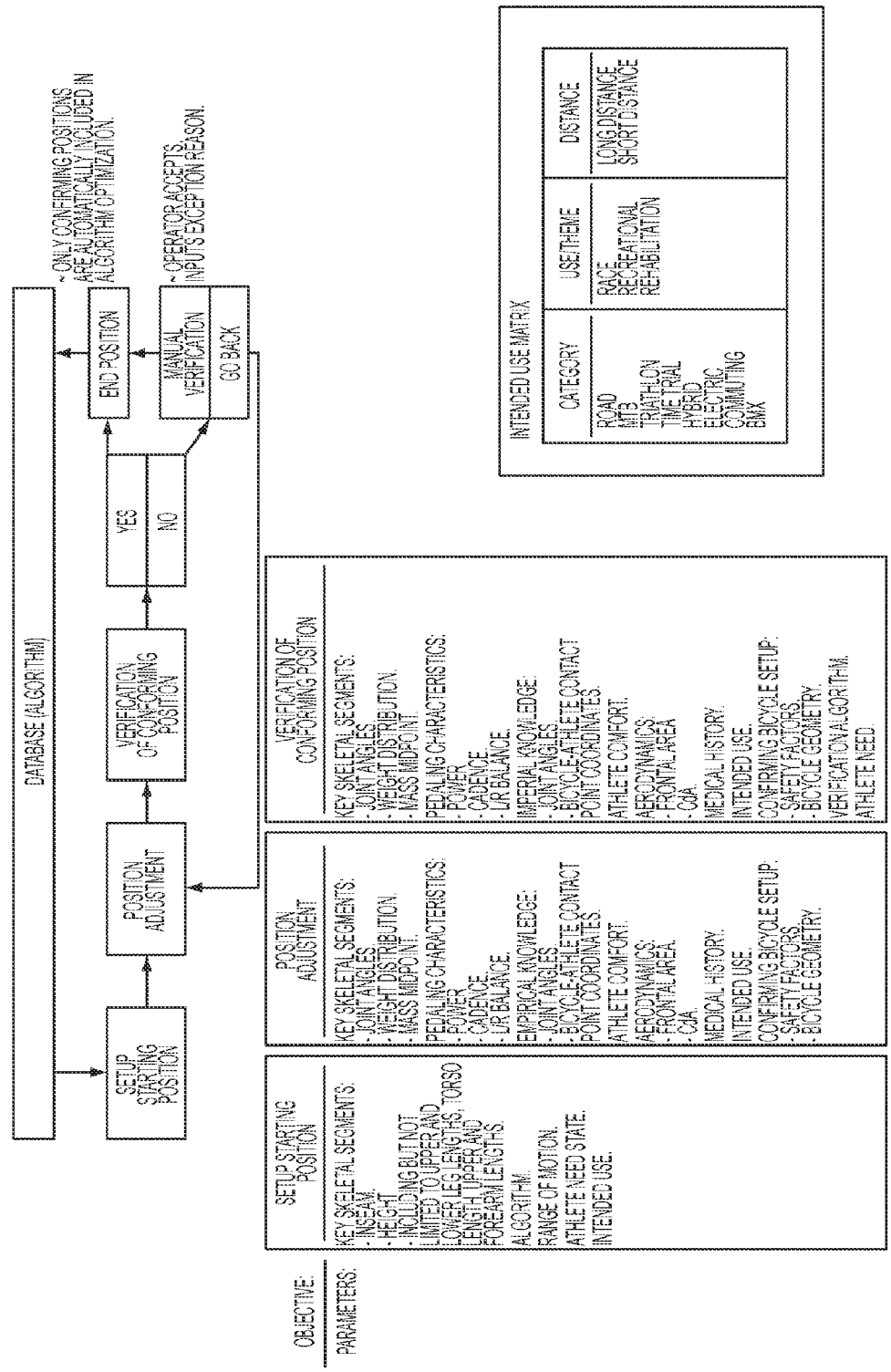
FIG. 13 is a flowchart depicting the process flow for one embodiment of a method for using a camera to collect anthropomorphic data to complete the initial setup of an adjustable stationary bicycle and to further confirm adjustments in real-time as the rider operates the bicycle.

In FIG. 6, a method 100 for adjusting a stationary bicycle, such as the stationary bicycle 10 of FIGS. 1 to 4, for instance used in combination with the stationary bicycle control system as described in FIGS. 1 to 5, is explained. FIG. 13 reflects an alternative embodiment for a method of adjusting a stationary bicycle wherein a camera system can be used both in determining the setup starting position (using the camera-collected anthropomorphic information) and in making component position adjustments (using the camera-collected joint angle and relative positioning data) in real-time as the rider is operating the bicycle.

Figure 13A:
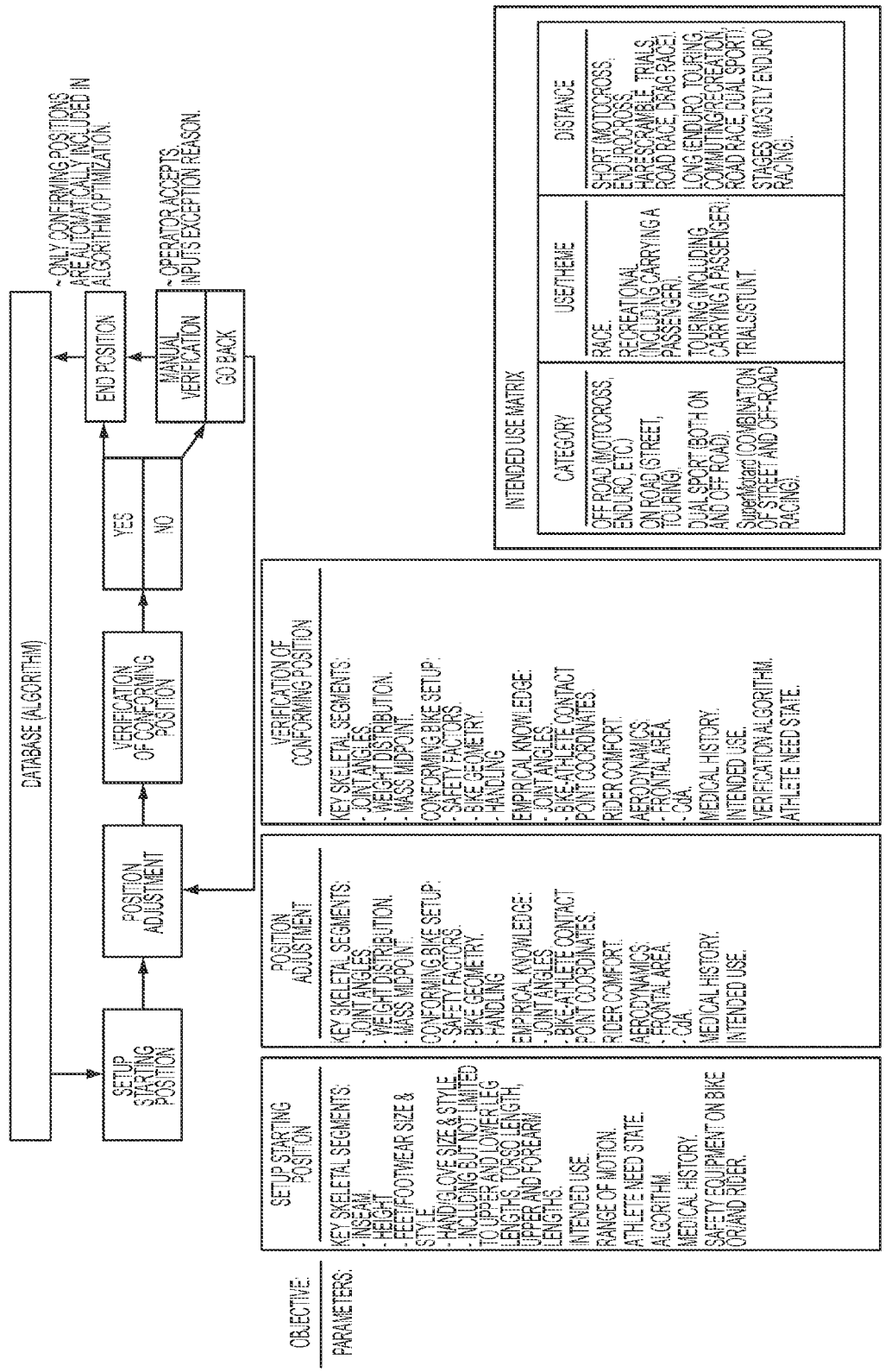
FIG. 13A is a flowchart depicting the process flow for one method of using a camera to collect anthropomorphic data to complete the initial setup of an adjustable stationary motorcycle and to further confirm adjustments in real-time as the rider simulates operation of the motorcycle.
Figure 14:
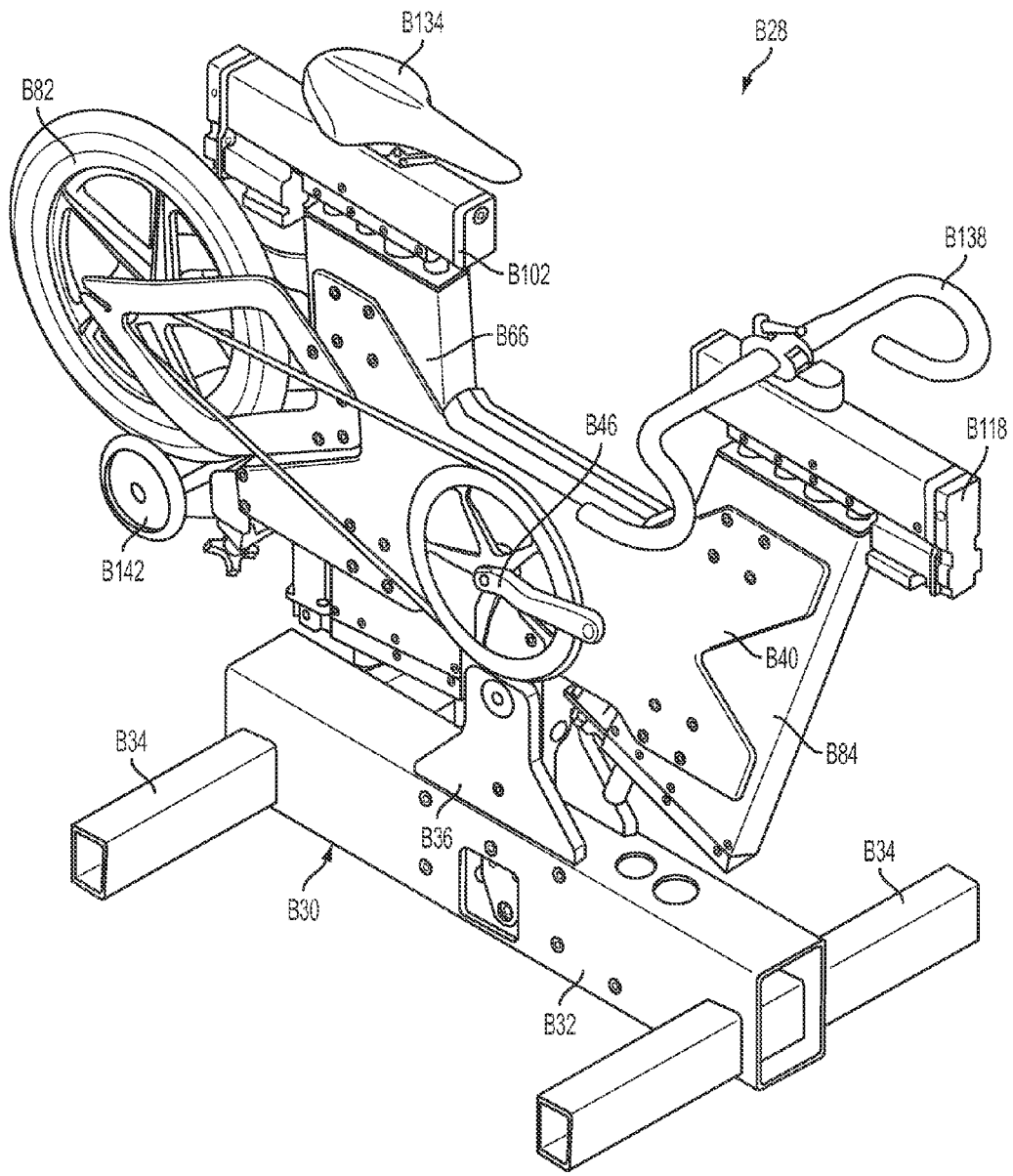
FIG. 14 is a perspective view of an adjustable stationary bicycle in accordance with the invention.
Figure 15:
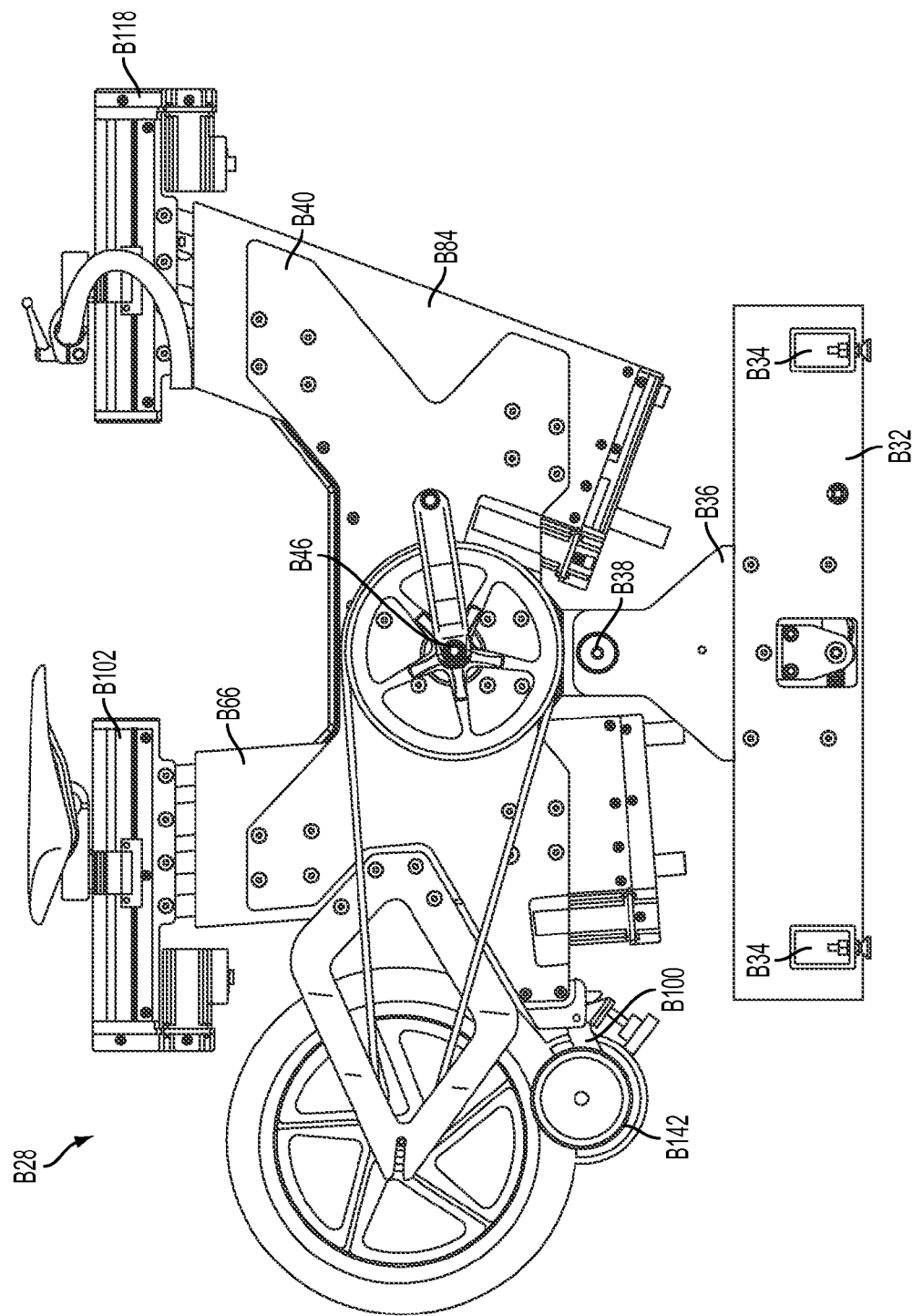
FIG. 15 is a left side of the adjustable stationary bicycle of FIG. 14.
Figure 17:
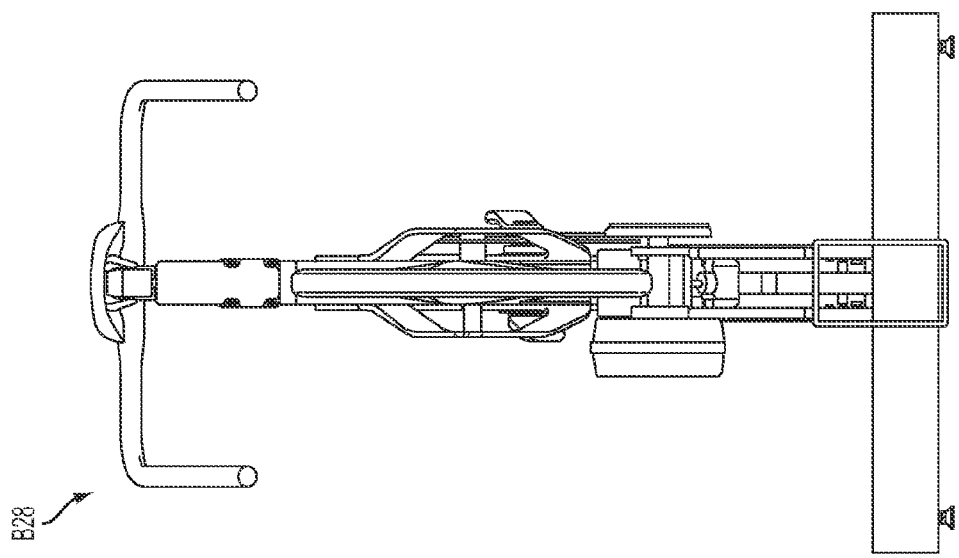
FIG. 17 is a rear view of the adjustable stationary bicycle of FIG. 14.
Figure 16:
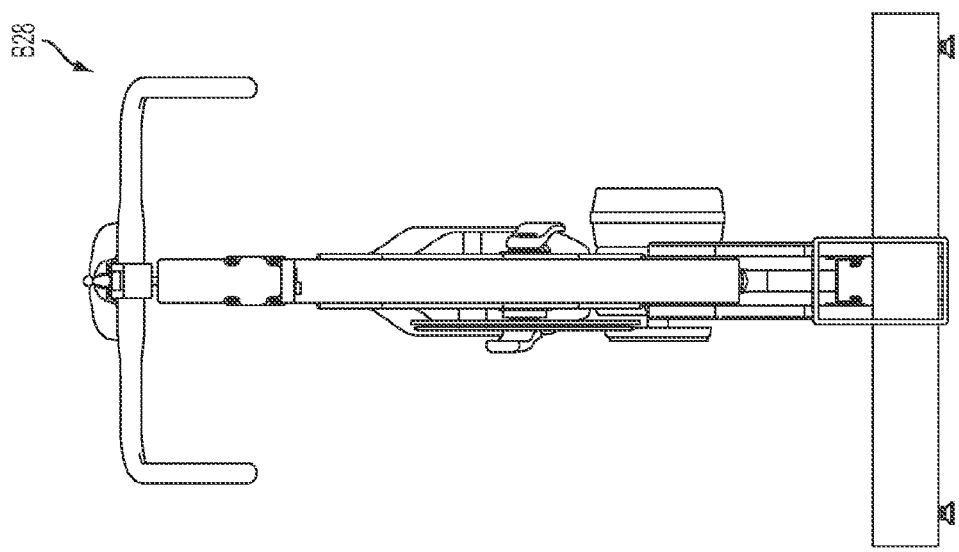
FIG. 16 is a front view of the adjustable stationary bicycle of FIG. 14.

FIG. 13A reflects an additional embodiment where the vehicle to be fit is a motorcycle. In this embodiment, the camera system can be used both in determining the setup starting position (using the camera-collected anthropomorphic information) and in making component position adjustments (using the camera-collected joint angle and relative positioning data, as explained below) in real-time as the rider is simulating riding the motorcycle. The process is similar to that used in the bicycle embodiment, but can include different variables for optimization because of the differences in the vehicle types. For example, where the bicycle embodiment measures power output, that is not a rider based factor in motorcycles. But, foot peg positioning can be an important function that will drive the selection of the optimal motorcycle or adjust fitting.

In step 102, data associated with the user of the stationary bicycle is obtained. In one embodiment, if it is the first time the user tries the stationary bicycle, the data is typically anthropometric data pertaining to the leg length (e.g., measured at the crotch), the torso dimensions, the arm length of the user, and the shoulder width. In the embodiment including a camera, this anthropomorphic data can be obtained by the camera and provided directly to the system. Additional information, such as user restrictions (e.g., back pain, knee problems, or the like), may also be recorded.

In another embodiment, in which the stationary bicycle is used in a training environment and the user already has a profile recorded in the stationary bicycle control system 50 (FIG. 5), the data obtained in step 102 is an identification of the user. By obtaining the identification of the user in step 102, the stationary bicycle control system 50 can load stationary bicycle dimensions as prerecorded in a user profile following a previous adjustment session.

In step 104, the dimensions of the stationary bicycle are selected as a function of the user data obtained in step 102. More specifically, if the data is anthropometric in nature, the stationary bicycle control system obtains typical dimensions from statistical data tables relating anthropometric data of numerous users to average dimensions associated with such data. In another embodiment, the selected dimensions of the stationary bicycle are provided with a user profile.

In step 106, the stationary bicycle is actuated to the selected dimensions using the various actuators described in FIGS. 1 to 5. In step 107, particularly useful when the stationary bicycle is used in a training environment, the stationary bicycle is ready for use. Step 107 is typically achieved if an adjustment fitting of the stationary bicycle was performed in a previous session.

In step 108, a testing period is provided for the stationary bicycle. More specifically, the user spins with the stationary bicycle in order to provide a personal appreciation of the specific selected dimensions. In step 108, the user or an operator (e.g., a trainer) use the interface of the stationary bicycle control system 50 in order to adjust the seat and handlebar position, to reach adjusted positions that are preferred by the user. It is also pointed out that an observer, such as a bike-shop specialist, can stand next to the user to provide comments on the stance and the pedaling style.

In one testing configuration, the adjusted positions are reached after several positions are tested. It is suggested to provide incremental variations of the bicycle dimension, and require that the user spins at a constant power. The comments of the user are gathered at each variation of position, to facilitate the selection of a bicycle size. It is also considered to film the user while pedaling to provide footage of pedaling actuation for different frame dimensions.

Figure 11:
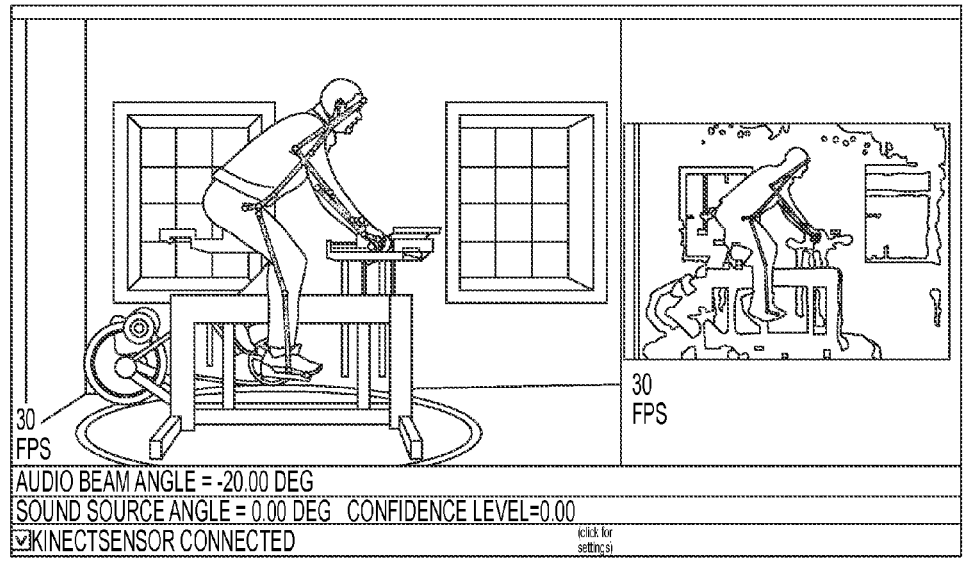
FIG. 11 is a computer screenshot depicting the side view real-time collection of anthropomorphic data for a rider on an adjustable stationary bicycle.
Figure 12:
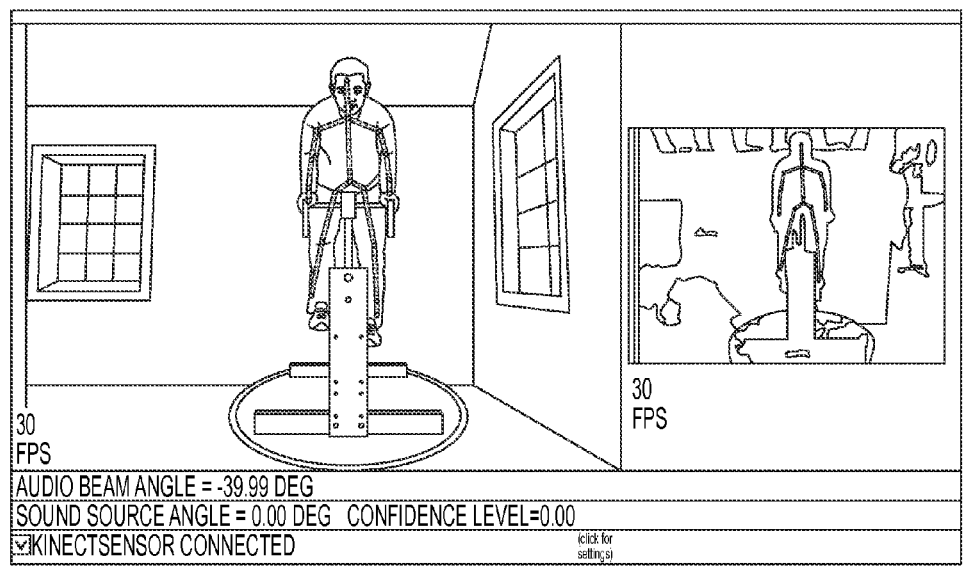
FIG. 12 is a computer screenshot depicting the front view real-time collection of anthropomorphic data for a rider on an adjustable stationary bicycle.

As shown in FIGS. 11 and 12, the camera system embodiment can be used to collect real-time anthropomorphic data and provide further refinement and adjustment to the component positions. The data that could be collected includes joint angles, and relative position in space (e.g., knee over toe) which can then be compared to ideal positions for the desired performance, and result in component position adjustment.

In another testing configuration, the adjusted positions are used after gathering parameters related to the performance of the user. More specifically, in optional step 109, measurements are made on parameters related to the performance of the user of the stationary bicycle. For instance, the pedaling power, the pedaling cadence, and the heart rate of the user are measured as a function of the stationary-bicycle dimensions. This step is typically performed for high-level athletes. Further data could be collected in the camera system embodiment for aerodynamic optimization based on estimated aerodynamic drag determined by the rider's position.

In step 110, once testing is completed and the user has elected final dimensions for the stationary bicycle, the adjusted dimensions are recorded for the user. Accordingly, if the stationary bicycle is used in a training environment, a profile specific to the user is recorded, so as to skip testing steps 108 and 109 at the next use.

In optional step 111, statistical data is recorded as a function of the anthropometric data so as to accumulate general data associating bicycle dimensions with anthropometric data. This accumulated data can be used to better provide initial setup, as well as real-time position optimization.

In step 112, particularly useful for bike-shop use, bicycle-frame dimensions are suggested in accordance with the adjusted positions recorded in step 110. In one embodiment, the bicycle-frame dimensions may be compared with the inventory of a shop, so as to determine as a function of the adjusted positions resulting from method 100 what bicycles in the shop are suited for the user. As an alternative embodiment, the bicycle-frame dimensions obtained in step 112 are forwarded to a bicycle manufacturer for the manufacture of a bicycle with such dimensions.

As described above, method 100 is well suited for determining an optimal bicycle size (combination of frame, stem, spacer(s) and seat post) for a given rider. The bicycle-frame dimensions of the determined optimal bicycle size may be compared with inventory of a shop so as to determine a best fit complete bicycle from available bicycles in the shop.

However, when custom fitting a bicycle to a given rider, it is preferable to select each of the frame, stem, spacer(s), and seat post separately, so that an optimal combination of components can be determined. As used herein, selection or determination of a spacer(s) includes the selection or determination of no spacer, or one or more spacers.

To better accommodate custom fitting, the bicycle controller system 50 includes a database 200 (see FIG. 5) for storing dimensions of bicycle frames, stems, spacers, and seat posts that are available for use, whether such availability is from shop inventory of the shop doing the custom fitting, or from other avenues of procurement, such as a manufacturer's inventory, or inventory of another shop that participates in a parts-exchange program. As discussed above, the information contained within database 200 may be stored in an external database and accessed via internet server 58.

Figure 7:
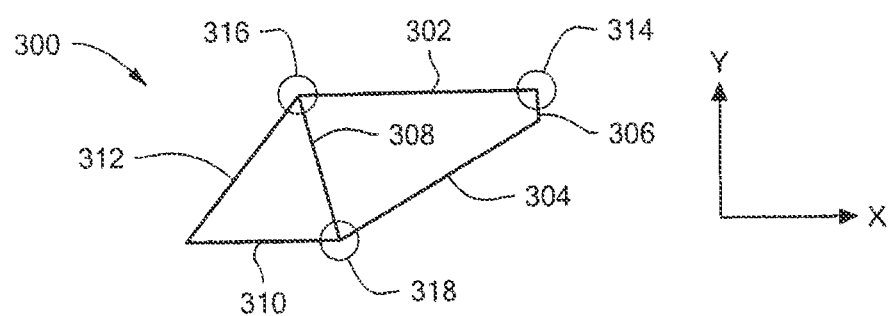
FIG. 7 depicts a one-line diagram representation of a bicycle frame having features related to features of the adjustable stationary bicycle of FIG. 1.
Figure 8:
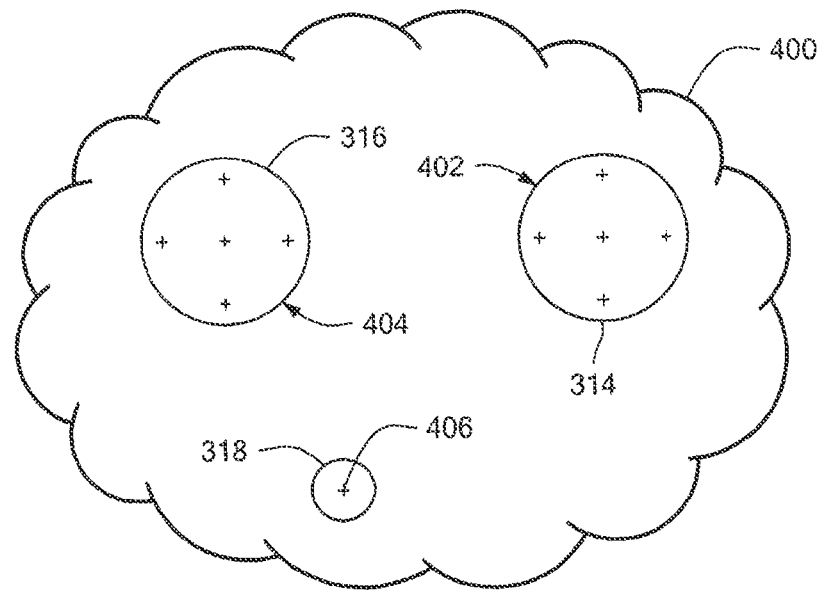
FIG. 8 depicts a first cloud of points that represent the X, Y coordinates of the top of a head tube, and the X, Y coordinates of the top of a seat post, relative to a central axis of a foot support, for all bicycle frames that are available to a fitter, for use in accordance with an embodiment of the invention.

The dimensions of the available bicycle frames are stored in database 200 in a "cloud of points" format, best seen with reference to FIGS. 7 and 8, where FIG. 7 depicts a one-line diagram representation of a bicycle frame 300 having a top tube 302, a down tube 304, a head tube 306, a seat tube 308, chain stay tubes 310, and seat stay tubes 312, all disposed and attached to each other in a manner known in the art, and FIG. 8 depicts an aggregate cloud of points 400 (also herein referred to as a first cloud of points) that represent the X, Y coordinates of the top of the head tube 402, and the X, Y coordinates of the top of the seat post 404, relative to the central axis of the foot support 406, for all frames 300 that are available to the custom fitter. The graphic circles 314, 316 and 318 relate the features of frame 300 depicted in FIG. 7 with the associated cloud of points 402 and 404 depicted in FIG. 8. As can be seen from the illustration of FIG. 8, there is only one X, Y coordinate for the foot support of each available frame, as this X, Y coordinate in used as the reference discussed above in connection with the center of the crank set 14. The dimensions of the available stems and spacers, and the dimensions of the available seat posts, are also stored in database 200 in a respective cloud of points formats.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A stationary fitting bike comprising:
    a frame having a horizontal longitudinal axis:
    a handlebar actuator mounted on a forward end of the frame for repositioning the handlebar relative to the frame;
    a crankset mounted on the frame;
    a seat slide assembly adapted to be attached to a seat;
    a seat actuator mounted on the rearward end of the frame for repositioning the seat relative to the frame, the seat actuator comprising:
        two spaced apart rods extending downward from the seat slide assembly and translatable relative to the frame, the seat slide assembly being attached proximate top ends of the rods;
        a cable tube extending downward from the seat slide assembly for the routing of control and power cables therethrough; and
        a rotatable shaft situated substantially parallel to the rods, wherein rotation of the shaft moves both rods and repositions the seat relative to the frame.

2. A fitting bike according to claim 1, wherein at least one of the handlebar actuator and the seat actuator are angled relative to perpendicular to the horizontal longitudinal axis of the frame, and wherein the seat actuator is angled relative to perpendicular to the horizontal longitudinal axis of the frame and the handlebar actuator is angled relative to perpendicular to the horizontal longitudinal axis of the frame.

3. A stationary fitting bike comprising:
    a frame having a horizontal longitudinal axis;
    a foot support in the form of a crank set, mounted on the frame;
    a seat actuator mounted on a rearward end of the frame for repositioning the seat relative to the frame; and
    a handlebar actuator mounted on a forward end of the frame for repositioning the handlebar relative to the frame, the handlebar actuator including:
        a handlebar support adapted to be attached to a handlebar;
        a top guide attached to handlebar housing; and
        two spaced apart rods extending to the top guide and translatable relative to the frame, the handlebar support being attached proximate top ends of the rods;
    wherein the handlebar actuator housing supports the top guide and at least partially surrounds the handlebar actuator, the handlebar actuator housing being connected to at least two spaced apart locations to the frame, and wherein the handlebar actuator further includes a cable tube extending between downward from the top guide for the routing of various control and power cables there through.

4. A stationary fitting bike comprising:
    a frame having a horizontal longitudinal axis;
    a handlebar actuator mounted on a forward end of the frame for repositioning the handlebar relative to the frame, the handlebar actuator including two spaced apart first rods extending from the handlebar slide assembly, wherein the first rods are translatable relative to the frame, and remain parallel to each other during translation;
    a seat slide assembly; and
    a seat actuator mounted on a rearward end of the frame for repositioning the seat slide assembly relative to the frame, the seat actuator including two spaced apart second rods extending from the seat slide assembly and translatable relative to the frame, wherein the second rods are translatable relative to the frame, and remain parallel to each other during translation, and wherein the seat actuator further includes a cable tube extending from the seat slide assembly for the routing of control and power cables therethrough.

* * * * *